United States Patent
Takeda et al.

(10) Patent No.: US 7,163,026 B2
(45) Date of Patent: Jan. 16, 2007

(54) VALVE UNIT AND FLUID CONTROL CHIP

(75) Inventors: Masatoshi Takeda, Kasuya-gun (JP); Kenichi Nakano, Fukuoka (JP); Kazuhiro Yamauchi, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 322 days.

(21) Appl. No.: 10/684,420

(22) Filed: Oct. 15, 2003

(65) Prior Publication Data
US 2004/0079424 A1    Apr. 29, 2004

(30) Foreign Application Priority Data
Oct. 16, 2002 (JP) .......................... P. 2002-301592
Nov. 21, 2002 (JP) .......................... P. 2002-337686

(51) Int. Cl.
*F16K 31/02* (2006.01)
(52) U.S. Cl. .................... 137/624.13; 137/38
(58) Field of Classification Search ............... 137/38, 137/624.13
See application file for complete search history.

(56) References Cited

U.S. PATENT DOCUMENTS

| | | | |
|---|---|---|---|
| 3,884,417 A | * | 5/1975 | Sheffield et al. ......... 239/102.2 |
| 3,934,601 A | | 1/1976 | Lavon |
| 4,166,605 A | | 9/1979 | Hall et al. |
| 5,052,429 A | * | 10/1991 | Yoo ............................ 137/38 |
| 5,441,597 A | | 8/1995 | Bonne et al. |
| 5,603,345 A | * | 2/1997 | Franklin et al. .............. 137/38 |
| 6,003,833 A | | 12/1999 | Tasi et al. |
| 6,082,185 A | | 7/2000 | Saaski |
| 6,279,872 B1 | | 8/2001 | Neuhaus |

FOREIGN PATENT DOCUMENTS

FR            2293988        7/1976

OTHER PUBLICATIONS

International Search Report dated Jan. 19, 2004.

* cited by examiner

*Primary Examiner*—Kevin Lee
(74) *Attorney, Agent, or Firm*—Stevens, Davis, Miller & Mosher, LLP

(57) ABSTRACT

A valve unit and a fluid control chip include: a valve chamber having an inlet and an outlet for a fluid; a valve element accommodated in the valve chamber; a piezoelectric element for applying vibrations to the valve chamber; and a driver for driving the piezoelectric element, wherein the piezoelectric element varies the opening by varying a frequency and/or an amplitude of the vibration applied to the valve chamber and by varying the amplitude of the valve element by the varied vibration.

21 Claims, 19 Drawing Sheets

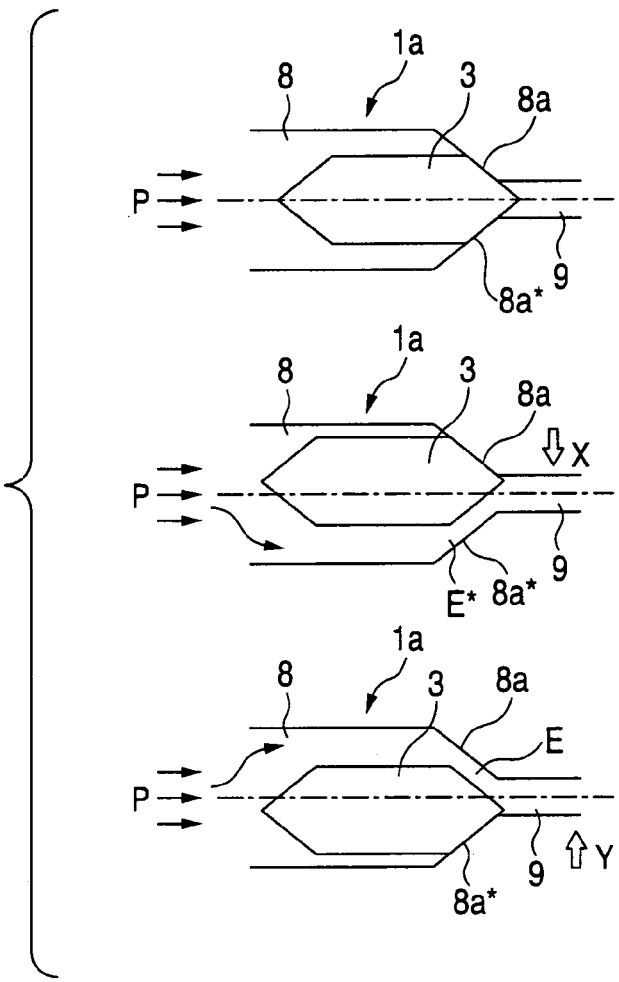
FIG. 3A
FIG. 3B
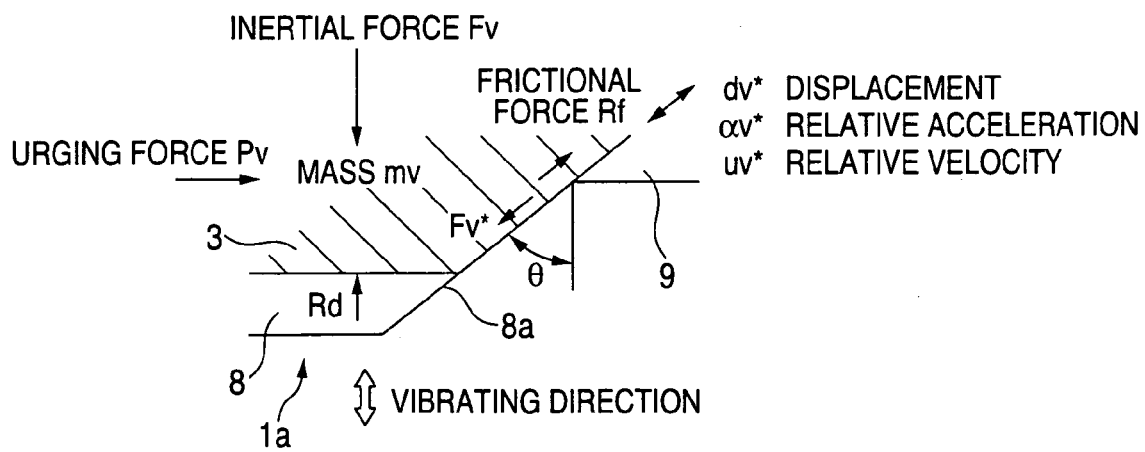

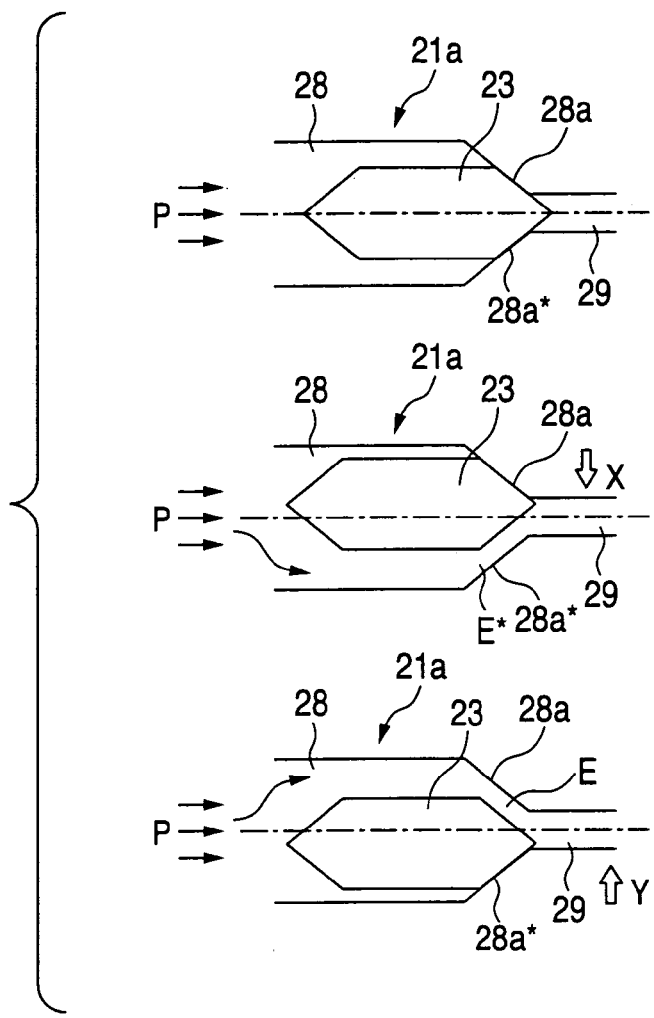
FIG. 10A
FIG. 10B
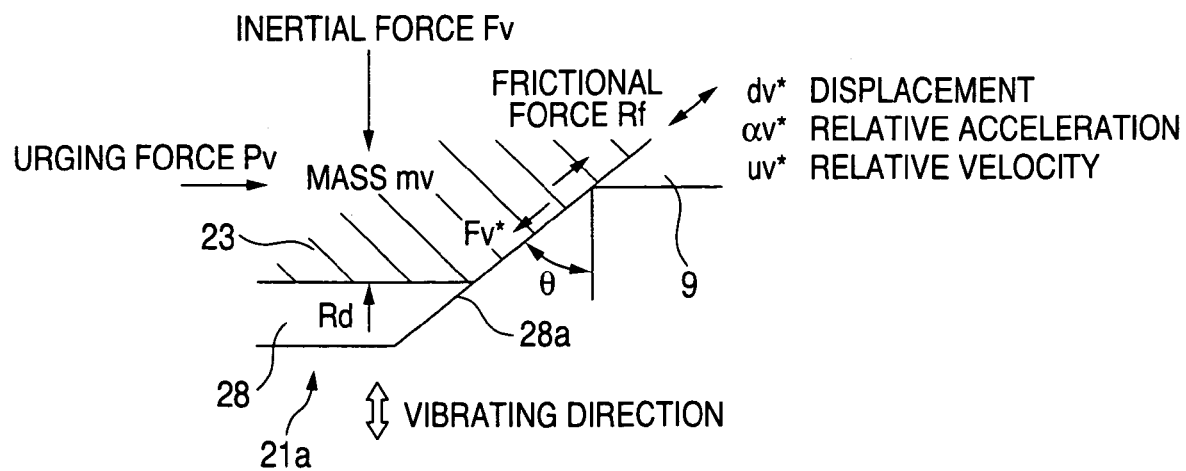

(1) DETECTED VALUE OF VIBRATION
(2) DETECTED VALUE OF VIBRATION CHANGE

VALVE UNIT AND FLUID CONTROL CHIP

BACKGROUND OF THE INVENTION

1. Field of the Invention

The present invention relates to a valve unit disposed in a channel for transporting a fluid and adapted to effect opening and closing by vibrations, as well as a fluid control chip incorporating the valve unit.

2. Description of the Conventional Art

There has been remarkable development in the recent nano technology and microscopic processing technology, and it is expected that these technologies will be merged together henceforth and develop into various application technologies.

As one of such merged technologies, attention has come to be focused on a microelectromechanical systems (MEMS) technology or so-called micromachines in which a semiconductor chip and a microactuator are integrated. In this technology, an LSI and an actuator which performs actual work are integrated and are accommodated in a several-square mm chip. In particular, it is expected that a combination of a microfluidic circuit and an LSI circuit will bring about a new merge.

In such a chip, at least a micropump for supplying a fluid to a channel, that channel, a plurality of sensors, a microvalve for opening and closing the channel, and an LSI circuit for driving them are integrated on a substrate serving as a fluidic circuit. The channel generally has a tube diameter on the order of several micro meters to several hundred micro meters, and the micropump and the microvalve are restricted by the size of this tube diameter.

Incidentally, this microvalve has a microstructure quite different from a general valve, and its function cannot be attained unless problems including leakage of the fluid, the reliability of the opening/closing operation, durability, and the like are resolved. In addition, this microvalve cannot be used as an element of the fluidic circuit of the chip unless its control is easy and accurate. Furthermore, since this microvalve is infinitesimally small, extremely high reliability is required, and it is affected by such inertia, vibration, and dimensional error that can be ignored in general valves.

Accordingly, a quick action type valve suitable for use as such a microvalve has been proposed, as disclosed on U.S. Pat. No. 6,279,872.

FIG. 18 is a schematic diagram of a conventional quick action type valve. This quick action type valve is arranged such that a chamber 101 is provided in a housing 100, and a valve seat 104 closed by a valve element 103 is disposed in its interior. The valve seat 104 is supported by an actuator 105 which is capable of expanding and contracting in the axial direction. The actuator 105 expands and contracts in response to an actuation signal. As a result, the valve seat 104 moves away from the valve element 103 at such a high speed that the valve element 103 cannot follow, and the movement of the valve element 103 is delayed by inertia, thereby forming a flow passing through the valve seat 104. This flow pushes back the valve element 103 to its closed position. The fluid is allowed to flow and controlled by the repetition of such operation. In addition, this quick action type valve can be changed over in a short changeover time, and high repetition speed is attained.

As described in the above, large expectations are placed on the chip in which the microfluidic circuit and the LSI circuit are merged, as described above. However, the microvalve which is incorporated in such a chip has a microstructure quite different from a general valve, and its function cannot be attained unless problems including leakage of the fluid, the reliability of the opening/closing operation, durability, and the like are resolved. In addition, there has been the problem that this microvalve cannot be used as an element of the fluidic circuit of the chip unless its control is easy and accurate. Because it is infinitesimally small, extremely high reliability is required, and it is affected by such inertia, vibration, and dimensional error, and the like that can be ignored in general valves.

In addition, the quick action type valve proposed in U.S. Pat. No. 6,279,872 can be changed over in a short changeover time, and high repetition speed can be obtained. However, since the channel is closed by pressing the valve element 103 against inlet/outlet ports of the valve seat 104 such as a metallic disk, problems are experienced in the reliability of the closing operation, pressure tightness at the time of pressure fluctuations, and so on. Moreover, since the opening of the channel is limited to within operating width (several micro meters to several dozen micro meters) of a piezoelectric element, the accuracy and responsiveness of control is difficult to control and is affected significantly by vibrations, dimensional errors, and the like. In addition, this quick action type valve has a narrow dynamic range, so that a maximum flow rate of the fluid flowing across the quick action type valve cannot be made large. At this time, if an attempt is made to cause the fluid to flow at a high rate and continuously, a large pulsating flow occurs.

SUMMARY OF THE INVENTION

In view of the above-described circumstances, it is an object of the present invention to provide a valve unit which makes it possible to effect control easily and accurately and provides a wide dynamic range, speedy response, and small pulsation. Another object of the invention is to provide a fluid control chip which makes it possible to effect control easily and accurately, facilitates replacement, and is economical.

In accordance with a first aspect of the invention, there is provided a valve unit comprising: a chamber having an inlet and an outlet for a fluid; a valve element accommodated in the chamber; and exciting means for vibrating the chamber, wherein an inclined portion is provided at the outlet, and the outlet is opened as the valve element moves with respect to the inclined portion when the chamber is subjected to vibration in a state in which the valve element is located at the inclined portion due to fluid pressure within the chamber and is moved by vibration by the exciting means.

In accordance with a second aspect of the invention, there is provided a fluid control chip comprising in combination: a first layer having a reservoir for holding a fluid; a second layer having a valve mechanism for controlling the flow of the fluid supplied from the first layer; a third layer having a reaction detecting portion for detecting the reaction of the fluid supplied from the second layer.

In accordance with a third aspect of the invention, there is provided a valve unit comprising: a chamber having an inlet and an outlet for a fluid; a valve element accommodated in the chamber; exciting means for vibrating the chamber; and a driver for driving the exciting means, the valve element being adapted to open and close the outlet of the chamber by vibration by the exciting means, wherein the exciting means varies one of the opening/closing of the outlet and an opening thereof by varying a frequency and/or an amplitude of a vibration applied to the chamber and by varying an amplitude of the valve element by the varied vibration.

In accordance with a fourth aspect of the invention, there is provided a fluid control chip comprising: a plurality of valve units each including a chamber having an inlet and an outlet for a fluid and a valve element accommodated in the chamber; a valve-equipped substrate in which the plurality of valve units are provided in such a manner as to be separated from each other in terms of vibrational science so as to be provided with mutually different natural frequencies; exciting means for applying a vibration to the valve-equipped substrate; and a driver for driving the exciting means, each of the valve elements being adapted to open and close the outlet of the chamber as the valve element is vibrated by the exciting means, wherein the exciting means varies the opening/closing state of the outlet or an opening level thereof by applying the vibration to the valve-equipped substrate with a frequency on which one or a plurality of natural frequencies of the valve units to be controlled are superimposed.

In accordance with the above-described aspects of the invention, it is possible to provide a valve unit capable of effecting accurate flow control of an infinitesimal amount of fluid and a fluid control chip capable of controlling a plurality of valve units, respectively.

BRIEF DESCRIPTION OF THE DRAWING

FIG. 3A is a phase diagram at a time when the valve element of the microvalve in the first embodiment of the invention is excited;

FIG. 3B is an explanatory diagram illustrating a force applied to the valve element shown in FIG. 3A;

FIG. 10A is a phase diagram at a time when the valve element of the valve unit in the sixth embodiment of the invention is excited;

FIG. 10B is an explanatory diagram illustrating a force applied to the valve element shown in FIG. 10A;

DESCRIPTION OF THE PREFERRED EMBODIMENT

Hereafter, a description will be given of the embodiments of the present invention with reference to the drawings.

First Embodiment

Figure 1A:
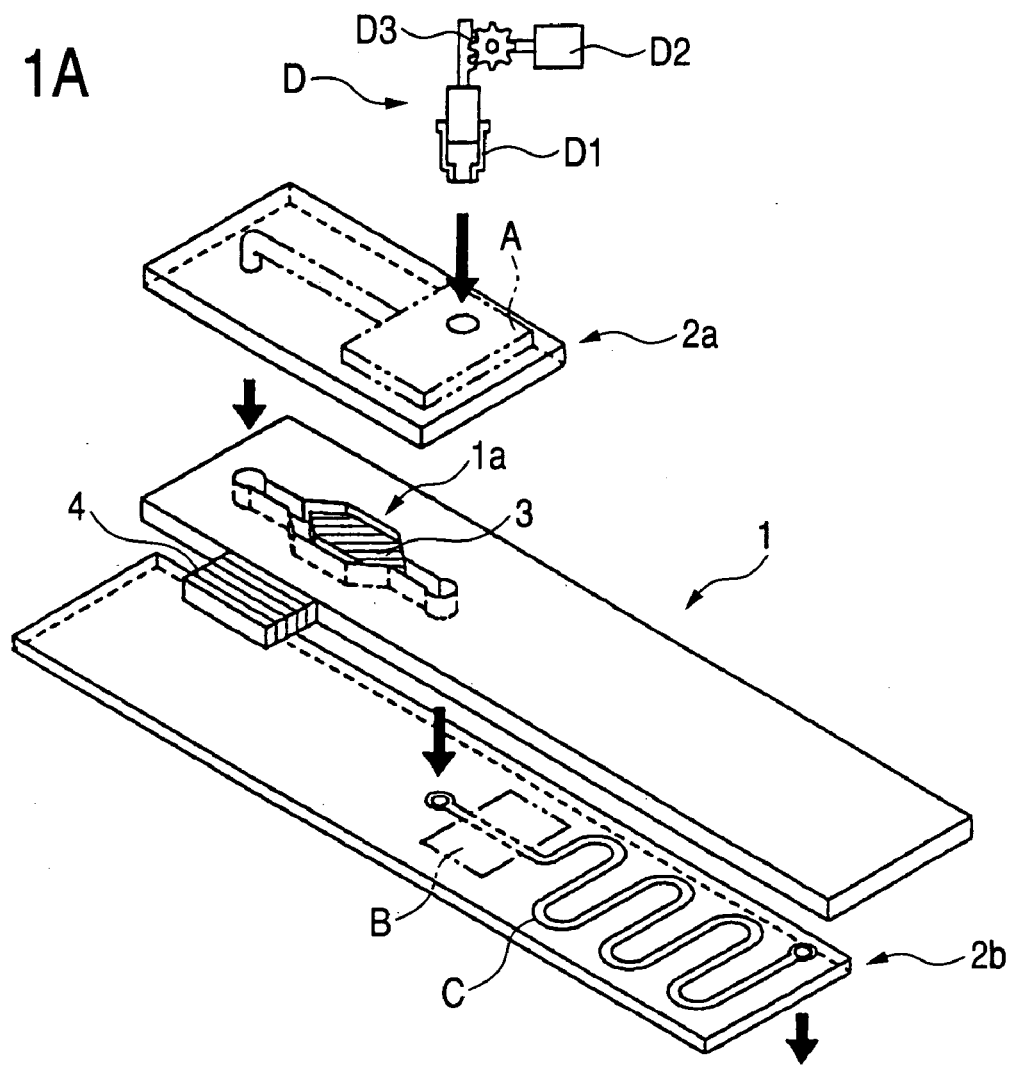
FIG. 1A is an exploded perspective view of the overall structure of a fluidic circuit chip using a valve unit in accordance with a first embodiment of the invention.
Figure 1B:
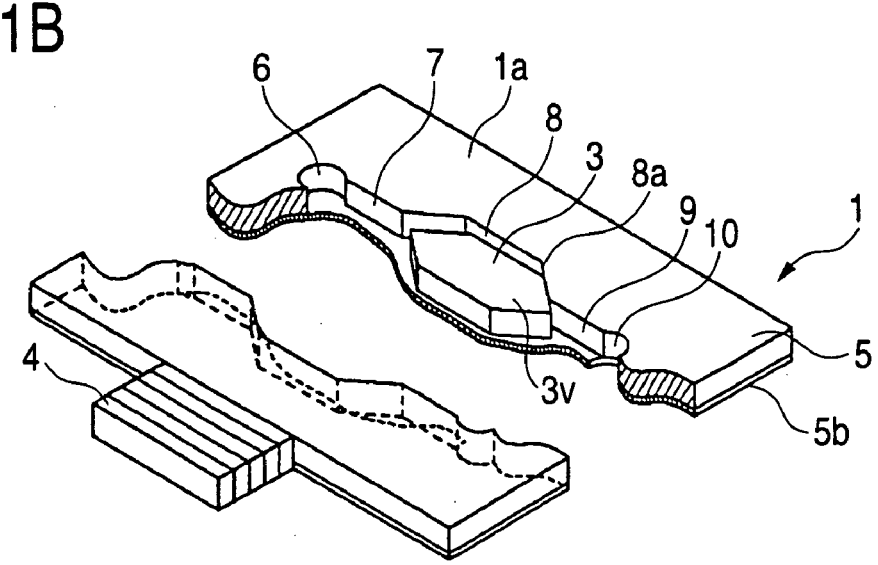
FIG. 1B is a fragmentary perspective view of the valve unit shown in FIG. 1A.

FIG. 1A is an exploded perspective view of the overall structure of a fluidic circuit chip using a valve unit in accordance with a first embodiment of the invention. FIG. 1B is a fragmentary perspective view of the valve unit shown in FIG. 1A.

Initially, a description will be given of the overall structure of the fluidic circuit chip using the valve unit in accordance with the first embodiment. In FIG. 1A, reference numeral 1 denotes a valve mounted chip (a second layer of the invention) which is provided with a valve mechanism which is opened and closed by the inertia of a valve element when vibration is applied thereto, a reaction force from a V-shaped inner wall surface (valve seat), and the pressure of a fluid supplied thereto. Reference character 1a denotes a microvalve (the valve unit of the invention) making up the valve mechanism of the valve-equipped chip 1. Reference character 2a denotes a reservoir portion (a first layer of the invention) having a reservoir A for holding the fluid to be supplied to the microvalve 1a. Reference character 2b denotes a fluidic circuit chip body (a third layer of the invention) having a fluidic circuit C (a reaction portion of the invention) which is provided with various sensors B (detecting portions of the invention) for measurement and is configured as a predetermined circuit. It should be noted that a device having pumping action is required to allow the fluid to be delivered from the reservoir portion 2a. In the first embodiment, a syringe pump D such as the one shown in FIG. 1A is used. The syringe pump D is arranged such that after the fluid is supplied to the reservoir portion 2a and is held therein, a motor D2 is driven to extend a syringe D1 by the action of a rack and pinion D3. Consequently, the air within the syringe D1 is pushed out, and the fluid (liquid) in the reservoir portion 2a is supplied by this air pressure. However, the pump may be of another type. Each of the valve-equipped chip 1, the reservoir portion 2a, and the fluidic circuit chip body 2b is a plate-shaped member of a predetermined thickness. In addition, although in this embodiment a description will be given hereafter of the microvalve 1a, this merely shows a number of preferred embodiments of the invention. The valve unit is naturally not limited to the microvalve 1a insofar as the valve unit is capable of being controlled by making use of excitation.

In addition, reference numeral 3 denotes a valve element having wedge-shaped heads formed at its both ends for effecting the opening and closing of the valve of the microvalve 1a. Numeral 4 denotes a piezoelectric element (exciting means of the invention) for controlling the valve element 3 by applying vibrations to the valve-equipped chip 1 from a direction perpendicular to the channel. The piezoelectric element 4 is arranged detachably with respect to the valve-equipped chip 1. It should be noted that the wedge-shaped head 3v may be formed only at one end side (outlet side) of the valve element 3; however, in the case of this first embodiment the wedge-shaped heads 3v are provided at both ends in order to impart the function of a check valve to the wedge-shaped head 3v on the inlet side. This will be described in a third embodiment. The valve-equipped chip 1 and the reservoir portion 2a are combined to constitute a channel control unit, and this channel control unit is laminated on the fluidic circuit chip body 2b. This assembly as a whole constitutes a fluid control chip. If the valve-equipped chip 1, the reservoir portion 2a, and the fluidic circuit chip body 2b are replaced, the pump such as the syringe pump and the piezoelectric element 4 can be used repeatedly.

Here, a description will be given of the details of the valve element 3. The material of the valve element 3 may be any one of metals in general, e.g., a ferroalloy, stainless steel, and aluminum, an inorganic material such as glass or a ceramic, and a resin or the like. As criteria for selecting the material, it is possible to cite superior workability, excellent surface physical properties such as specific gravity, hydrophilic property, and viscous resistance since inertia is made use of, and excellent corrosion resistance. To improve the hydrophilic property, viscous resistance, and corrosion resistance, surface treatment may be provided by using metal plating, coating, laser beam machining, or plasma arc machining. If the hydrophilic property and viscous resistance are improved, the action of the valve element 3 improves hydrodynamically.

Next, a detailed description will be given of the details of the valve-equipped chip 1. In FIG. 1B, reference numeral 5 denotes a valve body substrate in which an internal channel of the microvalve 1a has been formed in a stamped groove form. Reference character 5b denotes a lower substrate which covers a lower side of the stamped groove to form a channel. The reservoir portion 2a is laminated on an upper surface of the valve body substrate 5 to cover it, and the interior of the groove is formed as the channel. It should be noted that although the valve body substrate 5 is called a substrate to construct the microvalve 1a, the invention is not limited to the same. In the case of another valve unit, this portion is referred to as a valve body portion instead of being called the valve body substrate 5.

Here, as the material of the valve body substrate 5 and the lower substrate 5b, it is possible to use any one of an inorganic material such as glass or a ceramic, a resin or the like, and metals in general, e.g., a ferroalloy, stainless steel, and aluminum. The foremost criterion for selecting the material is superior workability, but as other criteria for selection it is possible to cite excellent light transmittance and corrosion resistance to allow observation and measurement from outside the chip by a photosensor. In addition, surface treatment is preferably provided by using metal plating, coating, laser beam machining, or plasma arc machining. The resistance is hydrodynamically reduced, and the immobilization of organic matter is also ameliorated.

It should be noted that although in this first embodiment the lower substrate 5b is provided, it is preferable to omit the lower substrate 5b and cover the lower side of the groove by the fluidic circuit chip body 2b. By so doing, it is possible to reduce the number of component parts and decrease the number of assembly steps.

Reference numeral 6 denotes an inlet port serving as a channel connection port for connection to the reservoir portion 2a. Numeral 7 denotes an inlet-side channel of a predetermined width and a predetermined height. Numeral 8 denotes a valve chamber (a chamber of the invention) in which the valve element 3 is accommodated. Reference character 8a denotes a V-shaped valve seat (an inclined portion of the invention) formed in the valve chamber 8. Numeral 9 denotes an outlet-side channel of a predetermined width and a predetermined height. Numeral 10 denotes an outlet port serving as a channel connection port for connection to the fluidic circuit chip body 2b. It should be noted that in the first embodiment the inlet port 6 and the inlet-side channel 7 correspond to an inlet of the invention, and the outlet-side channel 9 and the outlet port 10 correspond to an outlet in accordance with the invention. However, the forms of the inlet and the outlet are not limited to the same. In addition, the inlet port 6, the inlet-side channel 7, the outlet-side channel 9, and the outlet port 10 are formed integrally with the valve chamber 8.

The inlet-side channel 7, the valve chamber 8, and the outlet-side channel 9 are preferably arranged such that the center line of the channel is disposed rectilinearly so that rotational or swinging motion does not occur in the valve element 3. The width of the outlet channel 9 is on the order of several micro meters to several hundred micro meters, and the channel width is greater than the same but is generally on a similar order. The length of the valve element is preferably 2- to 10-fold of the channel width or thereabouts. The valve element 3 is pushed from behind by the pressure (back pressure) from the inlet port 6, and its wedge-shaped head 3v can be smoothly fitted to the valve seat 8a without play. Further, although in this embodiment the valve seat 8a is V-shaped and is provided symmetrically about the center line, the valve seat 8a my be constituted by a simple inclined surface. In that case, the valve element 3 assumes a correspondingly similar shape.

Figure 2:
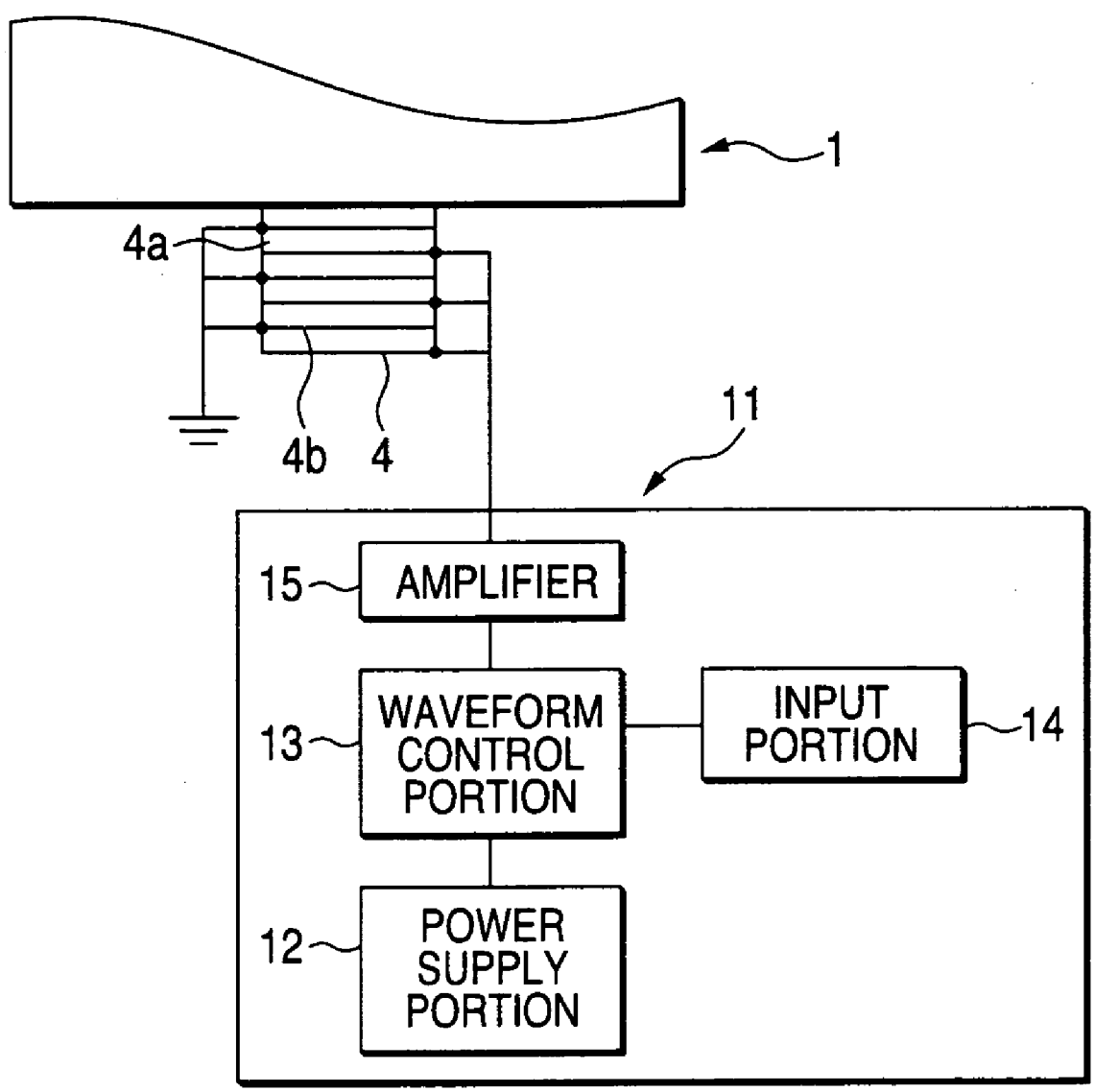
FIG. 2 is a schematic diagram of the driver of the valve unit in accordance with the first embodiment of the invention.

Next, a description will be given of a driver for controlling the microvalve 1a of the first embodiment. FIG. 2 is a schematic diagram of the driver of the valve unit in accordance with the first embodiment of the invention. In FIG. 2, reference character 4a denotes a piezoelectric layer made of such as lead-zirconate-titanate (PZT) and making up the piezoelectric element 4. Reference character 4b denotes an electrode sheet for applying voltage to the piezoelectric layer 4a. One of the pair of electrode sheets 4b opposing each other with the piezoelectric layer 4a sandwiched therebetween is grounded, and the voltage of a predetermined driving frequency is applied to the other electrode sheet 4b for the purpose of control.

Numeral 11 denotes a driver for controlling the position of the valve element 3 of the microvalve 1a, and numeral 12 denotes a power supply portion. Numeral 13 denotes a waveform controlling portion for varying the frequency and amplitude of current or voltage supplied from the power supply portion 12, or shaping the waveform. Numeral 14 denotes an input portion capable of controlling from the outside the waveform shaping which is effected by this waveform controlling portion 13. Numeral 15 denotes an amplifier for controlling the amplitude of an analog control signal shaped by the waveform controlling portion 13. As the driving current from the amplifier 15 is varied between positive and negative, the piezoelectric element 4 is capable of repeating expansion and contraction. It should be noted that an output from the driver 11 is shaped into an analog signal of a sinusoidal wave form, but the control signal from the input portion 14 is solely a digital signal. Since D/A conversion is required, it is preferable to provide digital processing as practically as possible to simplify the processing.

Next, a description will be given of the reason the microvalve 1a of the first embodiment becomes controllable by the excitation from the piezoelectric element 4. FIG. 3A is a phase diagram at a time when the valve element of the microvalve in the first embodiment of the invention is excited. FIG. 3B is an explanatory diagram illustrating a force applied to the valve element shown in FIG. 3A.

As shown in FIG. 3B, it is assumed that the valve seat 8a of the microvalve 1a has a cone angle θ, and comes into contact with the valve element 3 similarly having the angle θ at the wedge-shaped head 3v due to the back pressure from the inlet side at some point of time. At this time, an urging force PV including the back pressure is applied to the valve element 3 from the inlet-side channel 7 side, and the vibration of a frequency fc due to the piezoelectric element 4 is applied to the valve-equipped chip 1 in a direction perpendicular to the channel direction. Consequently, the valve element 3, as seen from the valve-equipped chip 1, moves at a relative acceleration αv and a relative velocity uv. Further, the relative acceleration αv is expressed by αv=g(T, fc), where T represents time.

Incidentally, the inertial force Fv applied to the valve element 3 is expressed by Fv=mv·αv. In addition, if it is assumed that the resistance coefficient of the fluid resistance Rd to which the valve element 3 is subjected is Kv, the fluid resistance Rd is expressed by Rd=Kv·uv2. If the coefficient of friction is assumed to be Kf, the frictional force Rf becomes Rf=Kf·(Pv cos θ).

Accordingly, if it is assumed that the relative acceleration and the relative velocity in a direction parallel to the valve seat 8a are αv* and uv*, Mathematical Formula 1 is obtained as the inertial force Fv* in the direction parallel to the valve seat 8a, and the relative acceleration αv* becomes αv*=Fv*/mv.

$$F_v^* = F_v \cos\theta - R_d \cos\theta - R_f \qquad \text{[Mathematical Formula 1]}$$

Accordingly, if it is assumed that the displacement of the valve element 3 in the direction parallel to the valve seat 8a is dv*, Mathematical Formula 2 is obtained. From these, Mathematical Formulae 3 and 4 are obtained. According to Mathematical Formula 4, it can be appreciated that the first term of Mathematical Formula 4 is proportional to the integral of g(T, fc), and that the second term is proportional to the integral of the square of g(T, fc).

$$d_v^* = \iint \alpha_v^* dTdT \qquad \text{[Mathematical Formula 2]}$$

$$F_v^* = (m_v g(T,f_c))\cos\theta - (K_v(\int g(T,f_c)dT)^2)\cos\theta - R_f \qquad \text{[Mathematical Formula 3]}$$

$$d_v^* = \qquad \text{[Mathematical Formula 4]}$$
$$\frac{1}{2mv}\iint\left\{(m_v g(T, f_c))\cos\theta - \left(K_v\left(\int g(T, f_c)dT^2\right)\cos\theta - R_f\right\}dTdT\right.$$

Accordingly, the displacement dv* of the valve element 3 becomes controllable by the variation of the frequency fc imparted from the driver 11, the magnitude of the acceleration, or the like. For example, if reference is made to FIG. 3A, the phase diagram in the upper stage of FIG. 3A shows that back pressure has been applied to the valve element 3, closing the microvalve 1a. The phase diagram in the middle stage shows that the valve chamber 8 has been excited in the X direction by the piezoelectric element 4, and that this action has caused the valve element 3 to receive a component of force in the opposite direction to that of the back pressure P from the valve seat 8a and to be pushed up in the opposite direction to that of the back pressure P, thereby forming a large channel E*. This pushing up means that the valve element 3 moves by sliding on the valve seat 8a or by springing up from the valve seat 8a in accordance with the frequency fc, the magnitude of the amplitude, and the like.

In addition, the phase diagram in the lower stage shows that, contrary to the phase diagram in the middle stage, the valve chamber 8 has been excited in the Y direction by the piezoelectric element 4, and that this action has caused the valve element 3 to receive a component of force in the opposite direction to that of the back pressure P from the valve seat 8a and to be pushed up in the opposite direction to that of the back pressure P, thereby forming a large channel E. In the same way as described above, the valve element 3 moves by sliding on the valve seat 8a* or by springing up from the valve seat 8a*.

Thus, when the valve element 3 is seated in the center between the valve seats 8a and 8a*, the microvalve 1a in accordance with the first embodiment closes the channel, is pushed up in the opposite direction to that of the back pressure P by one of the valve seats 8a and 8a*, forming the channel E or E*. The pushing-up force (inertial force Fv*) acting on the valve element 3 and the displacement dv* of the valve element 3 are varied by controlling the frequency fc of the piezoelectric element 4, the magnitude of the amplitude, the mass of the valve element itself, the cone angle θ of each of the valve seats 8a and 8a*, and so on. Accordingly, the size of each of the channels E and E*, i.e., the opening level of the microvalve 1a, is varied by adjusting these parameters, so that the flow rate can be controlled. In addition, as is apparent from the phase diagram of FIG. 3A, when the microvalve 1a of the first embodiment is in a state other than the closed state shown in the upper stage, one of the channels E and E* is constantly open, and there is no discontinuation in the flow. Hence, it is possible to obtain a stable flow rate at which the pulsation is small. Further, the displacement dv* of the valve element 3 is varied by the excitation by the piezoelectric element 4, but the magnitude of the displacement dv* is not dependent on only the magnitude of the piezoelectric element 4 itself. Namely, as the valve element 3 is forcibly moved up in the opposite direction to that of the back pressure P owing to the vibration, it is possible to form greater channels E and E* than those corresponding to the amplitude of the piezoelectric element 4, thereby making it possible to enlarge the maximum flow rate, i.e., the dynamic range.

As described above, in the microvalve 1a of the first embodiment, the valve element 3 in terms of its shape is provided with the wedge-shaped head 3v, and the valve seat 8a is formed in a V-shape, and excitation is effected by the piezoelectric element 4 in the direction perpendicular to the direction of flow in the valve chamber 8. Therefore, the opening level of the valve can be controlled by the frequency and the amplitude of the driving current applied to the piezoelectric element 4. Accordingly, control can be provided easily and accurately, the dynamic range is wide, and the response is fast since the reaction force of the valve seat 8a is used unlike the conventional quick action type valve. Even if pressure enhancement is attempted, the fluid does not leak by virtue of the shape of the valve element 3 and the shape of the valve seat 8a. A known method such as printing can be used in the processing of the valve-equipped chip 1, so that fabrication is facilitated, and the durability is excellent.

In addition, in this first embodiment, the piezoelectric element 4 excites in the direction perpendicular to the direction of flow in the valve chamber 8. However, it goes without saying that a similar operational effect can be obtained if an exciting method having a perpendicular direction component based on rotary motion or the like is used.

Second Embodiment

Figure 4A:
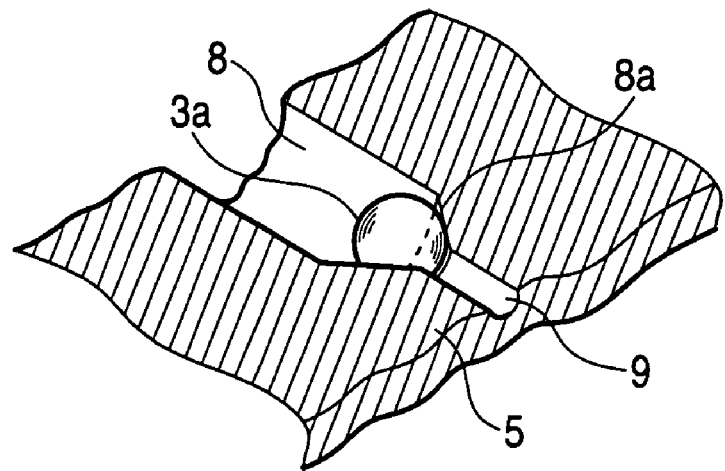
FIG. 4A is a fragmentary perspective view of the valve unit having a spherical valve element in accordance with the second embodiment of the invention.
Figure 4B:
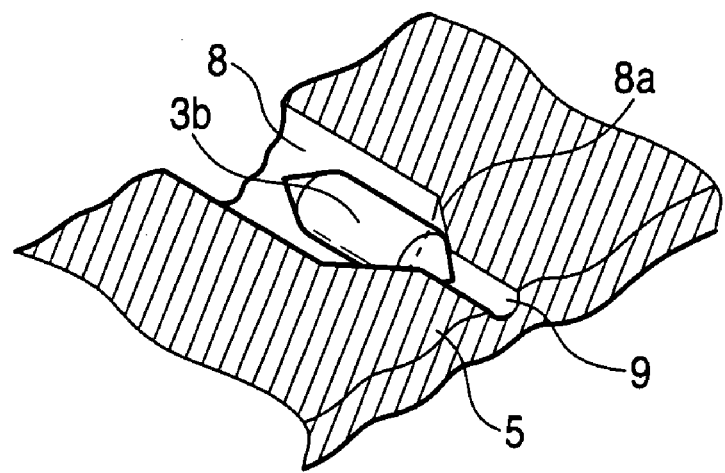
FIG. 4B is a fragmentary perspective view of the valve unit provided with a valve element having the conical wedge-shaped head 3v in the first embodiment of the invention.

Next, a description will be given of the microvalve 1a in accordance with a second embodiment. In the microvalve 1a of the second embodiment, the shape of the valve element head and the shape of the valve seat are arranged three-dimensionally. FIG. 4A is a fragmentary perspective view of the valve unit having a spherical valve element in accordance with the second embodiment of the invention. FIG. 4B is a fragmentary perspective view of the valve unit provided with a valve element having the conical wedge-shaped head 3v in the first embodiment of the invention.

In FIG. 4A, reference character 3a denotes a valve element having a spherical shape, and constitutes the microvalve 1a by being combined with a conical valve seat 8a. The valve element 3 of the first embodiment is provided with the wedge-shaped head 3v, which is fitted to the valve seat 8a having a V-shape. This is because the microvalve 1a forms the channel by means of a two-dimensional groove. However, the embodiments make use of the inertia of the valve element 3 at the time when excitation is effected sideways, the reaction force from the valve seat 8a, and the pressure from the back surface, and are not limited to the two-dimension. The second embodiment realizes the use of these forces by a three-dimensional axisymmetrical channel.

The spherical valve element 3a can be fabricated relatively easily by combining atomization and cooling or by grinding, polishing, and the like. Since it is spherical, the fabrication and assembly of the valve element 3 are facilitated. The ratio of the area when the valve is open to the area of the valve chamber 8 is larger than in the case of the two-dimensional configuration, so that the dynamic range can be increased.

In the case of the microvalve 1a shown in FIG. 4B, the valve element has the wedge-shaped head of a conical shape, as shown at 3b in FIG. 4B. This-valve element 3b is basically similar to the spherical valve element 3a. In addition, since the wedge effect becomes greater, this arrangement is suitable for pressure enhancement. It should be noted that the wedge effect referred to herein is the effect whereby the force is enhanced by the principle of the lever as a force is applied to the inclined surface from a direction different from that of the inclined surface (from the direction of the back pressure P in this embodiment).

Third Embodiment

Figure 5A:
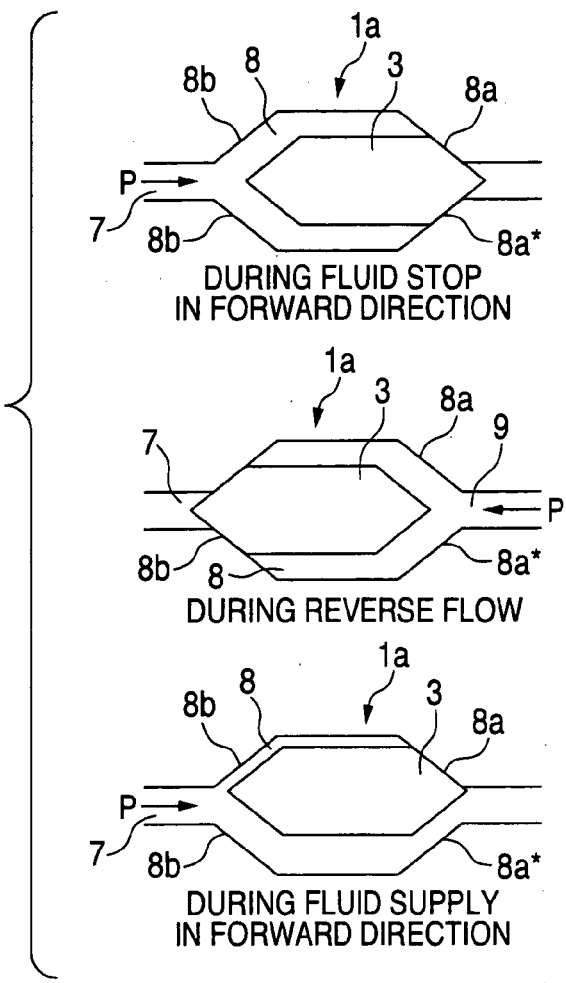
FIG. 5A is a diagram explaining the functions of the valve unit with a check valve function in accordance with the third embodiment of the invention.
Figure 5B:
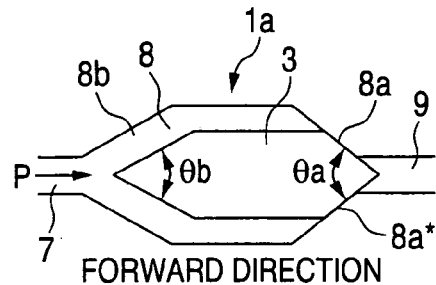
FIG. 5B is a schematic diagram of the valve unit with the check valve function shown in FIG. 5A.
Figure 5C:
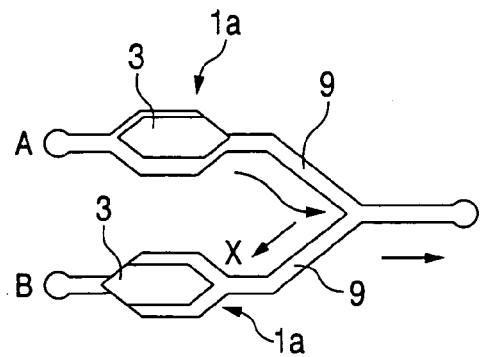
FIG. 5C is an explanatory diagram when the valve unit with the check valve function is used in a fluidic circuit.

The microvalve 1a in accordance with a third embodiment has the functions of both a control valve and a check valve. FIG. 5A is a diagram explaining the functions of the valve unit with a check valve function in accordance with the third embodiment of the invention. FIG. 5B is a schematic diagram of the valve unit with the check valve function shown in FIG. 5A. FIG. 5C is an explanatory diagram when the valve unit with the check valve function is used in a fluidic circuit.

In FIG. 5A, reference character 8b denotes an inlet-side valve seat which is fitted to the valve element 3 of the third embodiment. The valve element 3 in the third embodiment in terms of its shape is arranged in the form of a two-dimensional plate in the same way as the first embodiment. The wedge-shaped head is formed also on the inlet side of the valve chamber 8 in addition to the outlet side of the valve chamber 8. The check valve function is realized by the arrangement of the inlet-side wedge-shaped head and the inlet-side valve seat 8b.

At the time of fluid stop in the forward direction, as the back pressure is applied to the back of the valve element 3 from the inlet-side channel 7, the valve element 3 is pressed against the valve seat 8a and is closed. This is a normal function of the control valve. If the excitation by the piezoelectric element 4 is applied in this state, the position of the valve element 3 shifts from the center in the widthwise direction of the chamber, and is set in an open state necessary for the fluid supply in the forward direction. The excitation is continued in this state to supply the fluid. Subsequently, when the supply of the fluid and the excitation are stopped at some point of time, the high pressure flows backward from the output-side channel 9. This state is that of the diagram shown in FIG. 5A explaining the state at the time of reverse flow. At this time, the inlet-side wedge-shaped head of the valve element 3 is fitted to the input-side valve seat 8b and is capable of stopping the reverse flow.

Next, a description will be given of the construction with which the microvalve with the check valve function should be provided. As shown in FIG. 5B, it is assumed that the apex angle of the output-side wedge-shaped head of the valve element 3 is θa, and that the apex angle of the input-side wedge-shaped head is θb. Similarly, it is assumed that the receiving angle of the output-side V-shaped valve seat 8a. is θa, and that the receiving angle of the input-side valve seat 8b is θb. At this time, θa≧θb is the requirement which the microvalve with the check valve function should satisfy.

Namely, the wedge effect is greater if the apex angle of the input-side wedge-shaped head is formed into a more acute angle than that of the output-side wedge-shaped head. Therefore, the valve can be closed reliably even with a small pressure, and the reverse flow can be prevented more effectively. Meanwhile, at the time of fluid supply in the forward direction, if the apex angle θb of the input-side wedge-shaped head is smaller, the fluid resistance is less, and the pressure loss can be decreased. In the case of θa=θb, the fabrication of the valve element 3 is facilitated, and the microvalve can be assembled without needing to take into consideration the inserting direction of the valve element 3 at the time of assembly, so that the fabrication of the microvalve is facilitated.

In addition, the wedge effect is large if the shape of the valve element 3 is spherical, and the receiving angle of the input-side valve seat 8b of the valve chamber 8 is set to be smaller than the receiving angle of the valve seat 8a formed on the outlet side. Hence, the valve can be closed reliably even with a small pressure, and the reverse flow can be prevented more effectively.

FIG. 5C shows an example in which two output-side channels 9 each provided with the microvalve with the check valve function are made to converge to mix and react two kinds of liquids A and B. A case is assumed in which after the reaction, one liquid B is not supplied, but the other liquid A is continued to be supplied as it is. At this time, the microvalve with the check valve function on the liquid A side is opened and the pressure fluid is supplied, so that the liquid A flows into the output-side channel 9 on the liquid B side. If it is not the microvalve with the check valve function, the liquid A would pass through the liquid B-side microvalve and flow into the liquid B supply side. To prevent this, a check valve needs to be provided separately, but this is not required for the microvalve with the check valve function in accordance with the third embodiment.

Fourth Embodiment

Figure 6A:
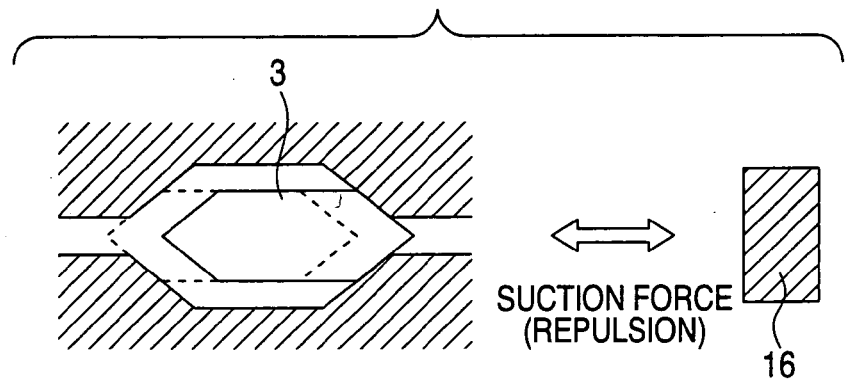
FIG. 6A is a diagram explaining the valve-element urging means for sucking the valve element of the valve unit in accordance with the fourth embodiment on a noncontact basis.
Figure 6:
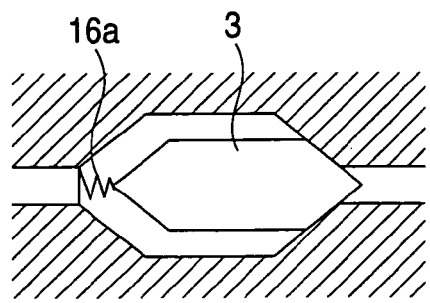
FIG. 6B is a diagram explaining a case where a first valve-element urging means for pressing the valve element by coming into contact therewith is provided.
FIG. 6C is a diagram explaining a case where a second valve-element urging means for pressing the valve element by coming into contact therewith is provided.
Figure 6C:
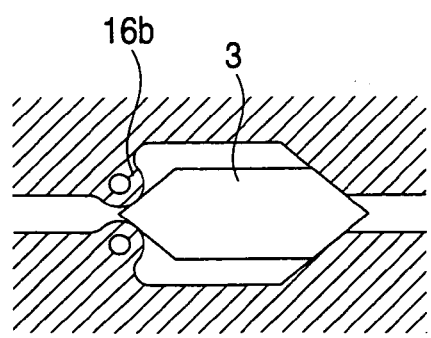

In a case where the microvalve 1a is closed, the back pressure is relatively small, so that the closure is not sufficient by the back pressure alone. Accordingly, the microvalve 1a in accordance with a fourth embodiment is provided with a valve-element urging means to enhance the valve closing pressure and render the closure reliable. FIG. 6A is a diagram explaining the valve-element urging means for sucking the valve element of the valve unit in accordance with the fourth embodiment on a noncontact basis. FIG. 6B is a diagram explaining a case where a first valve-element urging means for pressing the valve element by coming into contact therewith is provided. FIG. 6C is a diagram explaining a case where a second valve-element urging means for pressing the valve element by coming into contact therewith is provided.

In FIG. 6A, reference numeral 16 denotes a valve-element urging means which is provided in a state of noncontact with the microvalve 1a. This valve-element urging means 16 sucks the valve element 3 on a noncontact basis, and various means are available. In a case where the valve element 3 is a ferromagnet, a permanent magnet or an electromagnet is used as the valve-element urging means 16. In addition, in a case where the valve element 3 is a permanent magnet, the valve-element urging means 16 is a ferromagnet, a permanent magnet, or an electromagnet. As the valve element 3 is sucked to a central portion between the valve seats 8a and 8a* by this suction force, the microvalve 1a is reliably set in the closed state. Further, as shown by the broken lines in FIG. 6A, in the case of the microvalve with the check valve function, the valve element 3 can be reliably sealed and closed at the input-side valve seat by making use of the repulsion.

The valve-element urging means 16 described above is arranged to suck in a noncontact state or presses with the repulsion, and is disposed at a position spaced apart from the microvalve 1a. However, the valve-element urging means 16 may be provided in the microvalve 1a. In FIG. 6B, reference character 16a denotes an urging spring. The urging spring 16a is capable of imparting an urging force in a most simple construction by physically pressing from behind the valve element 3, but its assembly is difficult. In addition, reference character 16b shown in FIG. 6C denotes a resilient projecting piece formed by a swelling piece in the valve-equipped chip 1. The input-side wedge-shaped head of the valve element 3 is pressed by this resilient projecting piece 16b. In this case, the number of processing steps increases, but assembly is facilitated.

Thus, in the case of the microvalve 1a in accordance with the fourth embodiment, by providing the valve-element urging means 16, the valve element 3 can be reliably sealed and closed at the valve seats 8a and 8b. Since reliable closure is effected, the valve closing pressure can be enhanced. In addition, since the valve element is reliably present at a predetermined position at the time of the actuation start, the controllability (accuracy, etc.) of the fluid improves.

Fifth Embodiment

Figure 7A:
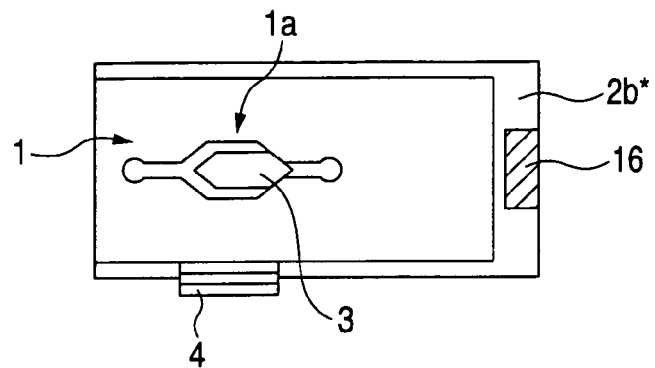
FIG. 7A is a diagram explaining a case where the valve-element urging means is provided on a holding member on which one valve unit in accordance with the fifth embodiment of the invention is mounted.
Figure 7B:
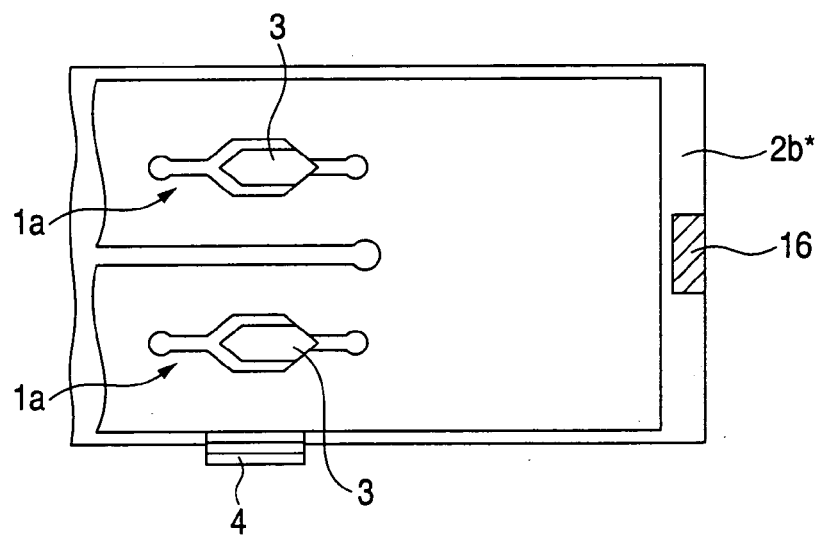
FIG. 7B is a diagram explaining a case where the valve-element urging means is provided on the holding member on which a plurality of valve units are mounted.
Figure 7C:
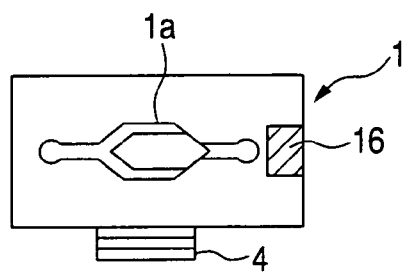
FIG. 7C is a diagram explaining a case where the valve-element urging means is provided on the valve-equipped chip.
Figure 7D:
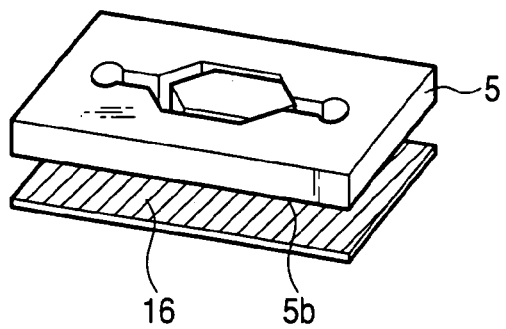
FIG. 7D is a perspective view in a case where the valve-element urging means is provided on the underside of the valve-equipped chip.

In the microvalve 1a and the fluid control chip in accordance with a fifth embodiment, a design is made in the layout of the valve-element urging means. FIG. 7A is a diagram explaining a case where the valve-element urging means is provided on a holding member on which one valve unit in accordance with the fifth embodiment of the invention is mounted. FIG. 7B is a diagram explaining a case where the valve-element urging means is provided on the holding member on which a plurality of valve units are mounted. FIG. 7C is a diagram explaining a case where the valve-element urging means is provided on the valve-equipped chip. FIG. 7D is a perspective view in a case where the valve-element urging means is provided on the underside of the valve-equipped chip.

In FIGS. 7A and 7B, reference character 2b* denotes a holding member for fixing the valve-equipped chip 1, i.e., the fluid control chip. In FIG. 7A, the valve-element urging means 16 is detachably provided at the position of a side surface of the valve-equipped chip 1 disposed on the holding member 2b* and provided with only one microvalve 1a. As this valve-element urging means 16, there are various types which urge on a noncontact basis, as described in the fourth embodiment. In a case where the valve element 3 is a ferromagnet, a permanent magnet or an electromagnet is used as the valve-element urging means 16. In a case where the valve element 3 is a permanent magnet, the valve-element urging means 16 is a ferromagnet, a permanent magnet, or an electromagnet. Since the valve-element urging means 16 in the case of FIG. 7A is attached to the holding member 2b*, the valve-element urging means 16 can be used repeatedly when the fluid control chip is replaced.

Next, in FIG. 7B, the valve-element urging means 16 is detachably provided at the position of the side surface of the valve-equipped chip 1 disposed on the holding member 2b* and provided with a plurality of (in this example, two) microvalves 1a. In this case, as can be understood from Mathematical Formula 4, by varying the driving frequency and the like of the piezoelectric element 4, it is possible to open only one microvalve 1a and keep the other microvalves 1a closed. Thus, the microvalve 1a which is open is controlled by selecting the driving frequency and the like. In the case of FIG. 7B, as the valve-element urging means 16 is provided on the holding member 2b*, the valve-element urging means 16 can be used repeatedly when the fluid control chip is replaced. In addition, since a plurality of valve-element urging means 16 are not required, the arrangement is more economical.

Furthermore, the valve-equipped chip 1 or the fluid control chip is arranged to be slidably held on the holding member 2b*, and the piezoelectric element 4 effects the operation of exciting only the chip by itself. At this time, since the amplitude of the piezoelectric element 4 is infinitesimally small on the order of several micro meters to several dozen micro meters, it is unnecessary for the valve-element urging means 16 to follow the movement of the chip.

Also, a case in which the valve-equipped chip 1, i.e., the fluid control chip, is fixed to the holding member 2b* and is excited together with the holding member 2b* by the piezoelectric element 4 is naturally applicable to this embodiment.

FIG. 7C shows a case in which the valve-element urging means 16 is provided on the valve-equipped chip 1. In this case, even in the state in which the fluid control chip alone is used, an urging force is applied to the valve element 3, so that the closed state of the valve element 3 can be maintained by the chip alone. Accordingly, since the fluid in the chip can be held as it is at the time of discarding the used fluid control chip, it is possible to provide a highly safe fluid control chip.

Incidentally, the valve-element urging means 16 can be fabricated simply by magnetizing the surface of the sheet-like lower substrate 5b, as shown in the perspective view of FIG. 7D. In this case, it is necessary to arrange magnetic paths so as to become parallel to the valve element 3.

In this way, in the microvalve 1a in accordance with the fifth embodiment, by designing the position of disposition of the valve-element urging means 16, the replacement of the fluid control chip alone becomes possible, affording a greater economic advantage. Furthermore, an advantage is also obtained in such as the improvement of safety as the fluid is held at the time of discarding. It should be noted that this microvalve technique is applied to valve mechanisms of sub millimeter order.

According to the microvalve in accordance with the embodiments of the invention, as the valve element moves on the inclined portion toward the chamber inlet by the vibration, it is possible to adjust the opening reliably and speedily. Further, control becomes easy and accurate, the dynamic range is wide, the response is fast, and pulsation becomes less. The valve element is reliably brought into contact with the inclined portion, so that even if pressure is enhanced, fluid leakage does not occur, the fabrication is facilitated, and the durability is excellent. As the chamber is vibrated, it becomes possible to move the valve element toward the inlet. The flow can be controlled quite easily by the variation of the vibration.

In addition, since one end of the valve element in terms of its shape is formed in a wedge shape, that wedge-shaped end of the wedge-shaped head comes into contact with the inclined portion. Hence, reliable contact is obtained by virtue of the wedge effect, so that the fluid does not leak even if the pressure is enhanced. In the case where the valve element is formed in the spherical shape, the fabrication and assembly of the valve element are facilitated. Similarly, in the case where the valve element is formed in the conical shape, the fabrication and assembly of the valve element are facilitated, and control is easy. Since the wedge effect becomes greater, pressure enhancement is made possible.

In addition, since the exciting means and the chamber are detachable, the exciting means can be used repeatedly when the replacement of the valve body portion is carried out. In the case where the exciting means is made a piezoelectric element, control can be provided electrically, and control is made easy and accurate. In addition, since the driver for generating a control waveform to be applied to the exciting means is provided, control can be provided very easily by controlling the waveform.

In addition, the shape of each end of the valve element is any one of the wedge-shaped, spherical, and conical forms, and the inclined portion which is brought into contact with the valve element is formed. Therefore, the check valve function can be provided by the input-side shape and the inclined portion. Further, the shape of each end of the valve element is wedge-shaped or conical, and the apex angle of the input-side end of the valve element is smaller than that of the output-side end thereof, while the angle made by the inclined portion formed on the inlet side of the chamber is smaller than the angle made by the inclined portion formed on the outlet side of the chamber. Therefore, the wedge effect is large, so that the valve can be closed reliably even with a small pressure, and the reverse flow can be prevented more effectively. At the time of fluid supply in the forward direction, if the apex angle of the input-side end is smaller, the fluid resistance is less, and the pressure loss can be decreased.

In addition, the shape of the valve element is spherical, and the angle made by the inclined portion formed on the inlet side is smaller than the angle made by the inclined portion formed on the outlet side. Therefore, the wedge effect is large, so that the valve can be closed reliably even with a small pressure, and the reverse flow can be prevented more effectively.

Furthermore, since the valve-element urging means for urging the valve element toward the outlet of the chamber is provided, the closure can be made reliable, and the closing pressure can be enhanced. Since the valve element is reliably present at a predetermined position at the time of the actuation start, the controllability (accuracy, etc.) of the fluid improves. In the case where the valve-element urging means is an electromagnet, and the valve element is a ferromagnet or a permanent magnet, an urging force can be imparted to the valve element on a noncontact basis. Therefore, the closure can be made reliable, and the closing pressure can be enhanced. In addition, since the valve element is reliably present at a predetermined position at the time of the actuation start, the controllability (accuracy, etc.) of the fluid improves. Furthermore, in the case where the valve element is a permanent magnet, the fluid leakage in the opposite direction can be reliably prevented when the check valve function is provided by controlling the magnetism of the electromagnet.

In addition, in the case where the valve-element urging means is a permanent magnet and the valve element is provided with a ferromagnet or a permanent magnet, an urging force can be imparted to the valve element on a noncontact basis. Therefore, the closure can be made reliable, and the closing pressure can be enhanced. In addition, since the valve element is reliably present at a predetermined position at the time of the actuation start, the controllability (accuracy, etc.) of the fluid improves. Furthermore, in the case where the valve-element urging means is a ferromagnet and the valve element is provided with a permanent magnet, an urging force can be imparted to the valve element on a noncontact basis. Therefore, the closure can be made reliable, and the closing pressure can be enhanced. In addition, since the valve element is reliably present at a predetermined position at the time of the actuation start, the controllability (accuracy, etc.) of the fluid improves.

In addition, since the valve-element urging means is an urging spring or a resilient projecting-piece, the closure can be made reliable, and the closing pressure can be enhanced. In addition, since the valve element is reliably present at a predetermined position at the time of the actuation start, the controllability (accuracy, etc.) of the fluid improves.

Next, according to the fluid control chip in accordance with the embodiments of the invention, since the valve unit and the channel portion are provided, the valve unit, whose replacement is facilitated and which is economical, can be made to undergo less fluid leakage and permits pressure enhancement. Therefore, the fluid control chip as a whole can be used with less fluid leakage and under high pressure. Furthermore, in the case where the reservoir portion for holding the fluid is provided, the valve unit, in which the replacement of the reservoir portion is facilitated and which is economical, can be made to undergo less fluid leakage and permits pressure enhancement. Therefore, the fluid control chip as a whole can be used with less fluid leakage and under high pressure. Since the valve-element urging means for urging the valve element toward the outlet of the chamber is provided outside the valve unit, by mounting the valve-element urging means outside the valve unit, the fluid control chip can be formed in to one which is easily replaceable, easy to use, and economical.

In addition, the fluid control chip is comprised of the first layer having the reservoir for holding the fluid, the second layer having a valve mechanism for controlling the flow of a fluid supplied from the first layer, and the reaction portion for causing the fluid supplied from the second layer to undergo reaction or the detection portion for detecting the reaction. Therefore, the relevant parts are easily replaceable, and can be used repeatedly in combination and economically. Further, in the case where the respective layers are detachable from each other, the relevant layers are easily replaceable, and can be used repeatedly in combination and economically.

In addition, since the upper side of the valve mechanism is covered by the lower surface of the first layer, the channel is formed in an open state and is then covered by the lower surface of the first layer. Therefore, it is possible to reduce the number of component parts and the number of assembly steps. Similarly, since the upper side of the reaction portion and/or the detecting portion is covered by the lower surface of the second layer, the channel is formed in an open state and is then covered by the lower surface of the second layer. Therefore, it is possible to reduce the number of component parts and the number of assembly steps.

In addition, since the valve-element urging means for vibrating the fluid control chip is provided, and the exciting means is provided outside the fluid control chip, by mounting the exciting means on the outside, the fluid control chip can be formed into one which is easily replaceable, easy to use, and economical. The exciting means is mounted detachably with respect to the fluid control chip. Since the exciting means is detachable with respect to the fluid control chip, the fluid control chip can be formed into one which is easily replaceable, easy to use, and economical.

Furthermore, since the valve-element urging means is provided outside the fluid control chip, by mounting the valve-element urging means on the outside, the fluid control chip can be formed into one which is easily replaceable, easy to use, and economical. Since the valve-element urging means is mounted detachably with respect to the fluid control chip, and the exciting means is detachable with respect to the fluid control chip, the fluid control chip can be formed into one which is easily replaceable, easy to use, and economical.

Sixth Embodiment

Figure 8A:
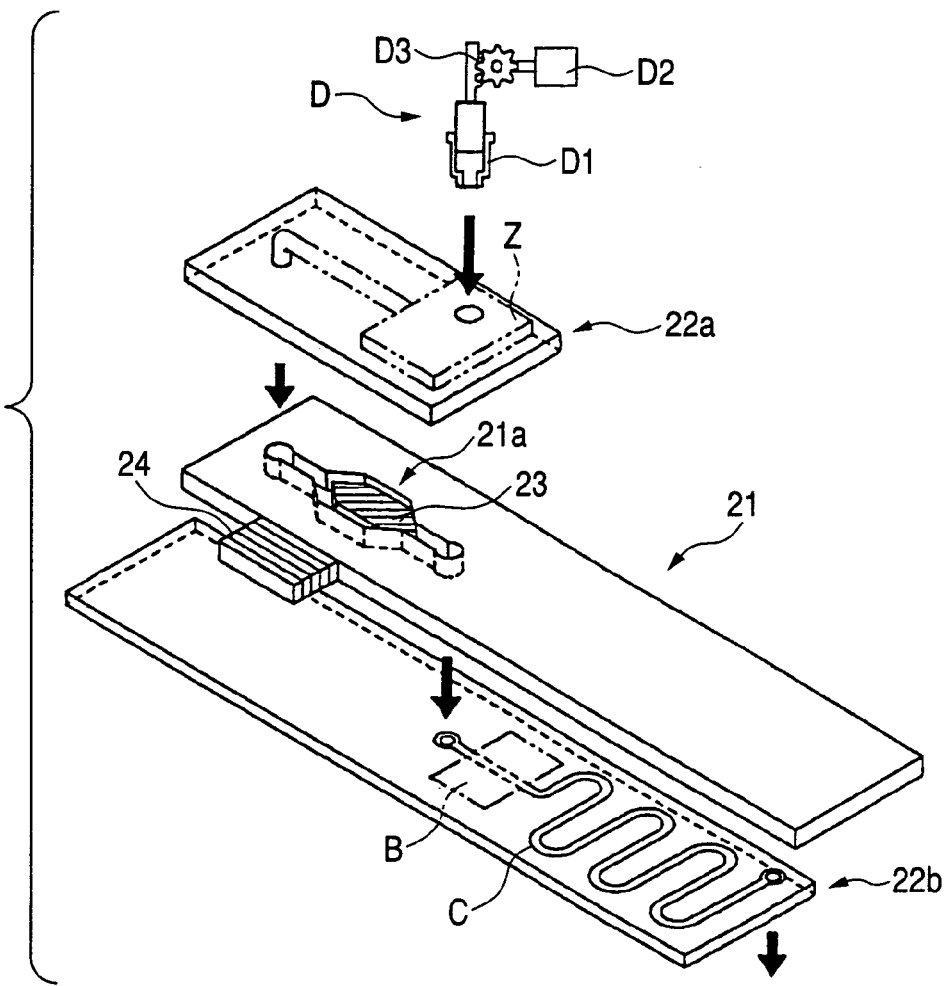
FIG. 8A is an exploded perspective view of the overall structure of the fluidic circuit chip using the valve unit in accordance with a sixth embodiment of the invention.
Figure 8B:
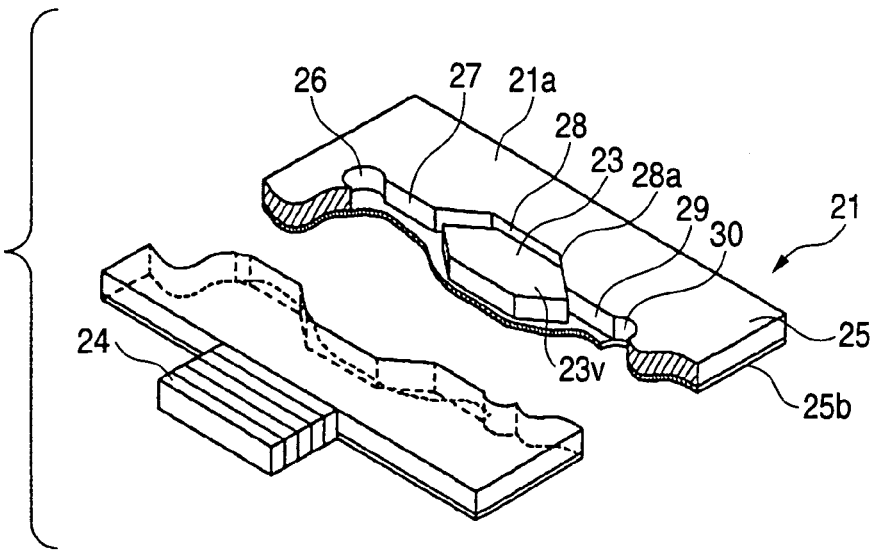
FIG. 8B is a fragmentary perspective view of the valve unit shown in FIG. 8A.

FIG. 8A is an exploded perspective view of the overall structure of the fluidic circuit chip using the valve unit in accordance with a sixth embodiment of the invention. FIG. 8B is a fragmentary perspective view of the valve unit shown in FIG. 8A.

Hereafter, a description will be given of the overall structure of the fluidic circuit chip using the valve unit in accordance with the sixth embodiment.

In FIG. 8A, reference numeral 21 denotes the valve mounted chip which is provided with a valve mechanism which is opened and closed by the inertia of the valve element when vibration is applied thereto, a reaction force from a V-shaped inner wall surface (valve seat), and the pressure of the fluid supplied thereto. Reference character 21a denotes the microvalve making up the valve mechanism of the valve-equipped chip 21. Reference character 22a denotes the reservoir portion having a reservoir Z for holding the fluid to be supplied to the microvalve 21*a*. Reference character 22*b* denotes the fluidic circuit chip body having the fluidic circuit C which is provided with various sensors B for measurement and is configured as a predetermined circuit. It should be noted that a device having pumping action is required to allow the fluid to be delivered from the reservoir portion 2*a*. In the sixth embodiment, the syringe pump D such as the one shown in FIG. 8A is used.

The syringe pump D is arranged such that after the fluid is supplied to the reservoir portion 22*a* and is held therein, the motor D2 is driven to extend the syringe D1 by the action of the rack and pinion D3.

Consequently, the air within the syringe D1 is pushed out, and the fluid (liquid) in the reservoir portion 22*a* is supplied by this air pressure. However, the pump may be of another type. In addition, an outlet-side reservoir portion 22*c* (see FIG. 14) may be provided on the lower surface of the fluidic circuit chip, as will be described later in a ninth embodiment. Each of the valve-equipped chip 21, the reservoir portion 22*a*, and the fluidic circuit chip body 22*b* is a plate-shaped member of a predetermined thickness.

In addition, although in this embodiment a description will be given hereafter of the microvalve 21*a*, this merely shows a number of preferred embodiments of the invention. The valve unit is naturally not limited to the microvalve 21*a* insofar as the valve unit is capable of being controlled by making use of excitation.

In addition, reference numeral 23 denotes the valve element having wedge-shaped heads formed at its both ends for effecting the opening and closing of the valve of the microvalve 21*a*. Numeral 24 denotes the piezoelectric element (exciting means of the invention) for controlling the valve element 23 by applying vibrations to the valve-equipped chip 21 from a direction perpendicular to the channel. The piezoelectric element 24 is arranged detachably with respect to the valve-equipped chip 21. It should be noted that the wedge-shaped head 23*v* may be formed only at one end side (outlet side) of the valve element 23; however, in the case of this embodiment the wedge-shaped heads 23*v* are provided at both ends in order to impart the function of a check valve to the wedge-shaped head 23*v* on the inlet side. The valve-equipped chip 21 and the reservoir portion 22*a* are combined to constitute a channel control unit, and this channel control unit is laminated on the fluidic circuit chip body 22*b*. This assembly as a whole constitutes a fluid control chip.

Further, there is a case where the fluid control chip is laminated on the output-side reservoir portion 22*c*. If the valve-equipped chip 21, the reservoir portion 22*a*, and the fluidic circuit chip body 22*b* are replaced, the pump such as the syringe pump and the piezoelectric element 24 can be used repeatedly.

Next, a description will be given of the details of the valve-equipped chip 21. In FIG. 8B, reference numeral 25 denotes the valve body substrate in which an internal channel of the microvalve 21*a* has been formed in a stamped groove form. Reference character 25*b* denotes the lower substrate which covers the lower side of the stamped groove to form a channel. The reservoir portion 22*a* is laminated on the upper surface of the valve body substrate 25 to cover it, and the interior of the groove is formed as the channel. It should be noted that although the valve body substrate 25 is called a substrate to construct the microvalve 21*a*, the invention is not limited to the same. In the case of a valve unit other than the microvalve 21*a*, this portion is referred to as a valve body substrate instead of being called the valve body substrate 25.

Reference numeral 26 denotes the inlet port serving as a channel connection port for connection to the reservoir portion 22*a*. Numeral 27 denotes the inlet-side channel of a predetermined width and a predetermined height. Numeral 28 denotes the valve chamber in which the valve element 23 is accommodated. Reference character 28*a* denotes the V-shaped valve seat formed in the valve chamber 28. Numeral 29 denotes the outlet-side channel of a predetermined width and a predetermined height. Numeral 30 denotes the outlet port serving as a channel connection port for connection to the fluidic circuit chip body 22*b*. It should be noted that in the sixth embodiment the inlet port 26 and the inlet-side channel 27 correspond to the inlet in accordance with the invention, and the outlet-side channel 29 and the outlet port 30 correspond to the outlet in accordance with the invention. However, the forms of the inlet and the outlet are not limited to the same. In addition, the inlet port 26, the inlet-side channel 27, the outlet-side channel 29, and the outlet port 30 are formed integrally with the valve chamber 28.

The inlet-side channel 27, the valve chamber 28, and the outlet-side channel 29 are preferably arranged such that the center line of the channel is disposed rectilinearly so that rotational or swinging motion does not occur in the valve element 23. The width of the outlet channel 29 is on the order of several micro meters to several hundred micro meters, and the channel width is greater than the same but is generally on a similar order. The length of the valve element is preferably 2- to 10-fold of the channel width or thereabouts. The valve element 23 is pushed from behind by the pressure (back pressure) from the inlet port 26, and its wedge-shaped head 23*v* can be smoothly fitted to the valve seat 28*a* without play by virtue of the wedge effect.

Namely, this is because the force is enhanced by the principle of the lever as a force is applied to the inclined surface from a direction different from that of the inclined surface (in this embodiment, from the direction of the back pressure P shown in FIG. 10). Further, although in this embodiment the valve seat 28*a* is V-shaped and is provided symmetrically about the center line, the valve seat 28*a* my be constituted by a simple inclined surface. In that case, the valve element 23 assumes a correspondingly similar shape.

Figure 9:
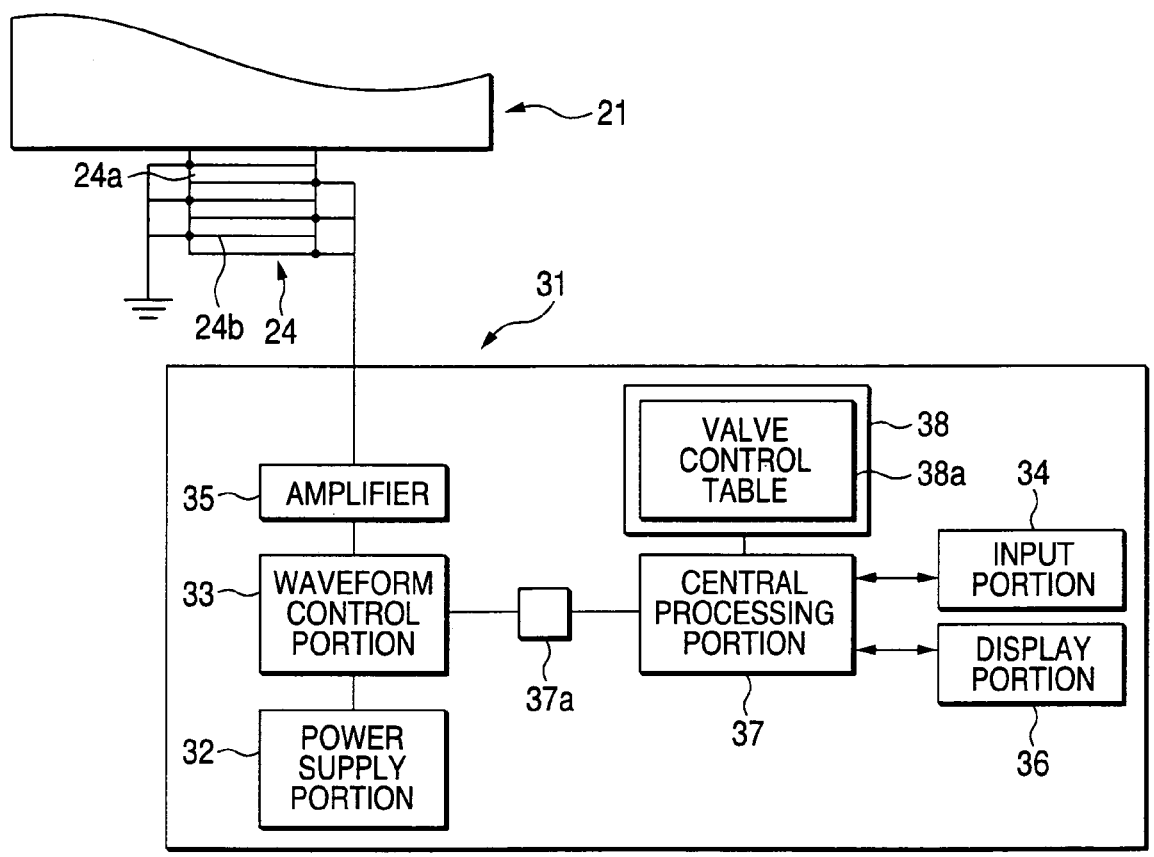
FIG. 9 is a schematic diagram of the driver of the valve unit in accordance with the sixth embodiment of the invention.

Next, a description will be given of a driver for controlling the microvalve 21*a* of the sixth embodiment. FIG. 9 is a schematic diagram of the driver of the valve unit in accordance with the sixth embodiment of the invention. In FIG. 9, reference character 24*a* denotes the piezoelectric layer made of such as lead-zirconate-titanate (PZT) and making up the piezoelectric element 24. Reference character 24*b* denotes the electrode sheet for applying voltage to the piezoelectric layer 24*a*. One of the pair of electrode sheets 24*b* opposing each other with the piezoelectric layer 24*a* sandwiched therebetween is grounded, and the voltage of a predetermined driving frequency is applied to the other electrode sheet 24*b* for the purpose of control.

Numeral 31 denotes the driver for controlling the position of the valve element 23 of the microvalve 21*a*, and numeral 32 denotes the power supply portion. Numeral 33 denotes a waveform controlling portion for varying the frequency and amplitude of current or voltage supplied from the power supply portion 32, or shaping the waveform. Numeral 34 denotes an input portion which, by specifying each control action, is capable of controlling from the outside the waveform shaping which is effected by this waveform controlling portion 33. Numeral 35 denotes the amplifier for controlling the amplitude of an analog control signal shaped by the waveform controlling portion 33. As the driving current from the amplifier 35 is varied between positive and negative, the piezoelectric element 24 is capable of repeating expansion and contraction.

Reference numeral 36 denotes a display portion for displaying on a display unit (not shown). Numeral 37 denotes a central control portion (a control portion of the invention) for controlling the overall system of the driver 31. Reference character 37a denotes a D/A converter. Numeral 38 denotes a storage portion for storing a control program for the central control portion 37 as well as data. Reference character 38a denotes a valve control table for storing control data for each control action of the microvalve 21a. It should be noted that the central control portion 37 is configured as a function realizing means which operates by reading the control program into a central processing unit (CPU) from the storage portion 38.

Accordingly, the central control portion 37, the input portion 34, the display portion 36, the storage portion 38, and the valve control table 38a can be configured by a personal computer or the like separately from the driver 31. In this case, the driver 31 becomes detachable. In addition, a drive output from the driver 31 is an analog signal, whereas a control signal from the central control portion 37 is solely a digital signal, so that D/A conversion is required at a midpoint. It is preferable to provide digital processing as practically as possible on the central control portion 37 side to simplify the analog processing.

In a case where the driver 31 in accordance with the sixth embodiment is operated, a list of valves subject to control and a list of control action thereof are displayed on a display device. Selection is made as to which valve is to effect what action, and necessary settings are provided from the input portion 34. The central control portion 37 fetches the inputted set values as well as control data from the valve control table 38a, determines a driving current to be applied to the piezoelectric element 24, and shapes the waveform by means of the waveform controlling portion 33.

In the sixth embodiment, an amplitude Adr and a frequency fdr of the driving current for valve control are read and are controlled, as will be described below. The piezoelectric element 24 is vibrated with an amplitude A and a frequency fc by the driving current. Basically, the formula fdr=fc holds, and although Adr is amplified, it is substantially proportional to A.

Accordingly, first, a description will be given of the basic principle whereby the microvalve 21a of the sixth embodiment becomes controllable by the excitation from the piezoelectric element 24, particularly by adjusting the amplitude A and the frequency fc.

FIG. 10A is a phase diagram at a time when the valve element of the valve unit in the sixth embodiment of the invention is excited. FIG. 10B is an explanatory diagram illustrating a force applied to the valve element shown in FIG. 10A.

As shown in FIG. 10B, it is assumed that the valve seat 28a of the microvalve 21a has a cone angle θ, and comes into contact with the valve element 23 similarly having the angle θ at the wedge-shaped head 23v due to the back pressure from the inlet side at some point of time. At this time, an urging force PV including the back pressure is applied to the valve element 23 from the inlet-side channel 27 side, and the vibration of the amplitude A and the frequency fc due to the piezoelectric element 24 is applied to the valve-equipped chip 21 in a direction perpendicular to the channel direction. Consequently, the valve element 23, as seen from the valve-equipped chip 21, moves at a relative acceleration αv and a relative velocity uv. The relative acceleration αv and the relative velocity uv are functions of the amplitude A and the frequency fc.

Incidentally, the inertial force Fv applied to the valve element 23 is expressed by Fv=mv·αv. In addition, if it is assumed that the resistance coefficient of the fluid resistance Rd to which the valve element 23 is subjected is Kv, the fluid resistance Rd is expressed by Rd=Kv·uvn (n is a measured value which differs depending on the fluid). If the coefficient of friction is assumed to be Kf, the frictional force Rf becomes Rf=Kf·(Pv cos θ).

Accordingly, a balance from a value in the direction parallel to the valve seat 28a is first considered to analyze the movement of the valve element 23. If it is assumed that the relative acceleration and the relative velocity in the direction parallel to the valve seat 28a are αv* and uv*, Mathematical Formula 5 is obtained as the force Fv* in the direction parallel to the valve seat 28a, and the relative acceleration αv* becomes αv*=Fv*/mv.

$$F_v^* = F_v \cos\theta - R_d \cos\theta - R_f \qquad \text{[Mathematical Formula 5]}$$

Accordingly, if it is assumed that the displacement of the valve element 23 in the direction parallel to the valve seat 8a is dv*, Mathematical Formula 6 is obtained.

$$d_v^* = \int u_v^* dT = \int\int \alpha_v^* dTdT \qquad \text{[(Mathematical Formula 6]}$$

From these, Mathematical Formulae 7 and 8 are obtained. According to Mathematical Formula 8, it can be appreciated that the first term of Mathematical Formula 8 is an inertia term proportional to the integral of mv·αv*, that the second term is a fluid resistance term proportional to the integral of Kv·uv*n, and that the third term is a frictional force term proportional to the frictional force.

$$F_v^* = (m_v \alpha_v^*)\cos\theta - (K_v U_v^* n)\cos\theta - R_f \qquad \text{[Mathematical Formula 7]}$$

$$d_v^* = \int\int (m_v \alpha_v^*)\cos\theta\, dTdT - \int\int (K_v u_v^* n)\cos\theta\, dTdT + \int\int R_f dTdT \qquad \text{[Mathematical Formula 8]}$$

The valve element 23 is displaced by dv* of Mathematical Formula 7 in the direction parallel to the valve seat 28a, but the relative acceleration αv and the relative velocity uv of the valve element 23 in the direction perpendicular to the flow are expressed by Mathematical Formulae 9 and 10. The displacement dv of the valve element 23 in its widthwise direction is expressed by dv* cos θ.

$$\alpha_v = \frac{d2}{dt2}(d_v^* \cos\theta) \qquad \text{[Mathematical Formula 9]}$$

$$u_v = \frac{d}{dt}(d_v^* \cos\theta) \qquad \text{[MathematicalFormula 10]}$$

However, it is inevitable to solve each of Mathematical Formulae 7 and 8 and Mathematical Formulae 9 and 10 by a discretization method such as difference calculus. Accordingly, before obtaining a numerical solution, the amplitude A or the frequency fc is fixed and an qualitatively examined in accordance with Mathematical Formula 7.

Figure 11:
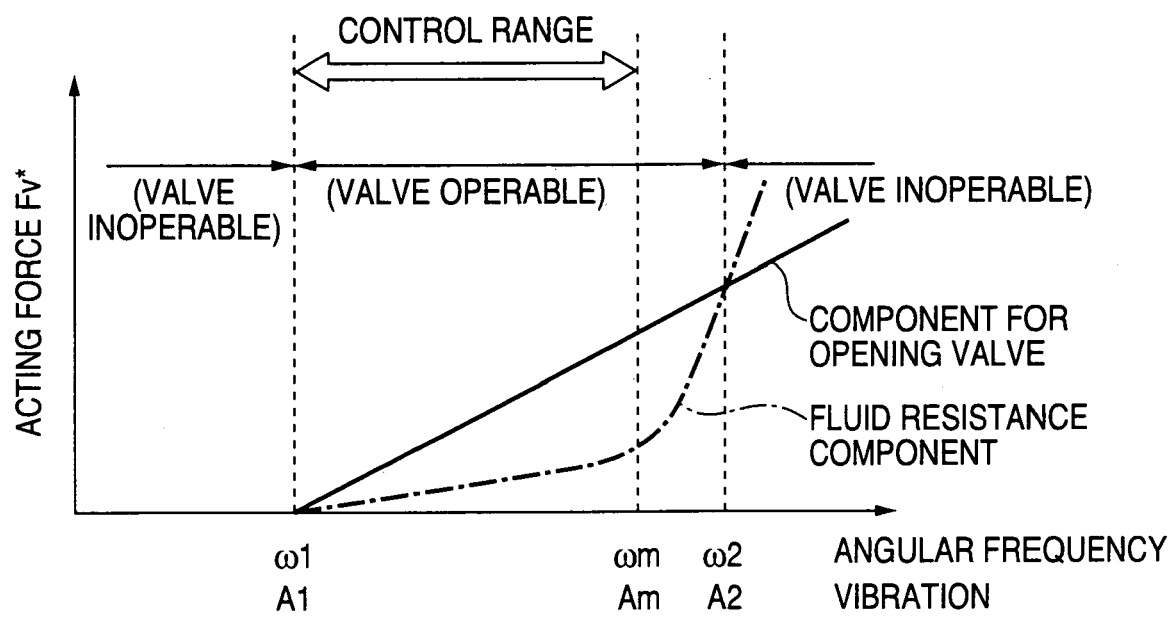
FIG. 11 is a diagram explaining the relationship between the angular frequency of vibration applied to the valve unit of the sixth embodiment of the invention and the force acting on the valve.

FIG. 11 is a diagram explaining the relationship between the angular frequency of vibration applied to the valve unit of the sixth embodiment of the invention and the force acting on the valve.

If an angular frequency ω (ω=2 pfc) is used hereafter for the sake of explanation, in a case where the angular frequency ω is smaller than a predetermined ω1, i.e., ω<ω1, the inertial force of the first term of Mathematical Formula 3 acts, tending to cause movement. Due to an energy shortage, however, the frictional force of the third term overcomes the inertial force, so that the displacement of the valve element 23 does not occur. Naturally, the fluid resistance of the second term does not occur, either. Accordingly, both the relative acceleration αv and the relative velocity uv are 0s. In other words, the valve element 23 is in a valve-inoperable region where it rests on the valve seat 28a and remains immobilized.

Next, in the case of ω1<ω<ω2, the inertial force of the first term becomes large and exceeds the magnitude of the frictional force of the third term, so that movement occurs. Following this, the fluid resistance of the second term also occurs. This region becomes a valve-operable region. The relative acceleration αv and the relative velocity uv are functions of the angular frequency ω. The vibration imparted by the piezoelectric element 4 with the amplitude A and the angular frequency ω may be a function which may assume whatever waveform. However, as can be appreciated from Mathematical Formula 6, uv* is the differential of this function and is proportional to the product of ω itself and the differential of ω. In addition, since the second term has Kv·uv*n as its elements, it is evident that the second term has an element proportional to a component of the n-th power of ω. From this, it is apparent that the second term has a small value where the angular frequency is close to ω1, but quickly tends to have a large value where it is close to ω2. This fluid resistance constitutes a component for suppressing the opening of the valve element 23.

In contrast, the inertial force of the first term is a second order differential of a function of vibration and is complex. However, as can be understood from the fact that uv* becomes large in proportion to the product of ω itself and the differential of a function of ω, the inertial force of the first term generally becomes gradually large with respect to ω. This inertial force constitutes a component for opening the valve element 23.

Accordingly, as shown in FIG. 11, as for the microvalve 21a, the opening or closing of the valve becomes possible at ω1. When ω becomes greater than this, a state continues in which the component for opening the valve element 23 is greater than the fluid resistance component. When the angular frequency approaches ω2 and the fluid resistance increases sharply, the component for opening the valve element 23 is offset, and its effective component starts to decrease and reaches 0 at ω2.

When ω2<·ω, the inertial force of the first term becomes smaller than the frictional force of the third term, and the movement stops. In this state, the force for opening the microvalve 21a is insufficient and ceases movement. Accordingly, this region is a valve-inoperable region.

Next, an examination will be made of the variation based on the amplitude A when the frequency fc is fixed. At this time, the amplitude A is assumed to be not a function of time t but a constant. This variation is utterly similar to the variation of the frequency fc when the amplitude A is fixed. In a case where A<A1 with respect to a predetermined A1, the inertial force of the first term in Mathematical Formula 7 acts and tends to effect movement. Due to an energy shortage, however, the frictional force of the third term overcomes the inertial force, so that the displacement of the valve element 23 does not occur. Naturally, the fluid resistance of the second term does not occur, either. This region is the valve-inoperable region.

Meanwhile, in the case of A1≦A≦A2, the inertial force of the first term, which is the component with which the inertial force tends to open the valve element 23, becomes large and exceeds the magnitude of the frictional force of the third term, so that movement occurs. Following this, the fluid resistance of the second term also occurs. The inertial force becomes large in proportion to A. However, it can be understood that since the fluid resistance has an element proportional to the component of the n-th power of A, the second term has a small value where the amplitude is close to A1, but quickly has a large value where it is close to A2. Accordingly, with the microvalve 21a, the opening of the valve element 23 becomes possible between A1 and A2, and the force for opening the valve element 23 becomes 0 at A2.

When A2<A, the inertial force of the first term becomes smaller than the frictional force of the third term, and the movement stops. In this state, the force for opening the microvalve 21a is insufficient and ceases movement. Accordingly, this region is the valve-inoperable region.

Thus, it can be understood that the valve-operable region is in the range of ω1≦ω≦ω2 or A1≦A≦A2. For the sake of control, however, the angular frequency X or the amplitude A and the acting force Fv* in terms of their relationship should favorably correspond to each other uniformly (one-to-one). Accordingly, the microvalve 21a of the sixth embodiment should preferably be controlled within the range in which the acting force Fv* increases simply with respect to the angular frequency ω, i.e., within ω1≦ω≦ωm, or, similarly, within the range in which the acting force Fv* increases simply with respect to the amplitude A, i.e., within A1≦A≦Am. This being the case, however, it is possible to use ωm≦ω≦ω2 or Am<A≦A2. In addition, in a case where the microvalve 21a is to be closed, it suffices if control is provided such that ω=ω1 or less or ω2 or more, or A=A1 or less or A2 or more.

As can be understood from the foregoing description, the displacement dv* of the valve element 23 becomes capable of controlling the opening of the valve by the variation of the amplitude A or the angular frequency X imparted from the driver 31. For example, if reference is made to FIG. 10A, the phase diagram in the upper stage of FIG. 10A shows that back pressure has been applied to the valve element 23, closing the microvalve 21a. The phase diagram in the middle stage shows that the valve chamber 28 has been excited in the X direction by the piezoelectric element 24, and that this action has caused the valve element 23 to receive a component of force in the opposite direction to that of the back pressure P from the valve seat 28a and to be pushed up in the opposite direction to that of the back pressure P, thereby forming a large channel E*. Incidentally, this pushing up means that the valve element 23 moves by sliding on the valve seat 28a or, in some cases, by springing up from the valve seat 28a in accordance with the angular frequency ω of the driving current, the magnitude of its amplitude A, and the like.

In addition, the phase diagram in the lower stage shows that, contrary to the phase diagram in the middle stage, the valve chamber 28 has been excited in the Y direction by the piezoelectric element 24, and that this action has caused the valve element 23 to receive a component of force in the opposite direction to that of the back pressure P from the valve seat 28a and to be pushed up in the opposite direction to that of the back pressure P, thereby forming a large channel E. It should be noted that, in controlling the valve, the valve opening can be adjusted by varying the valve characteristics by selecting the mass of the valve element itself, the cone angle θ of each of the valve seats 28a and 28a*, and so on.

Figure 12A:
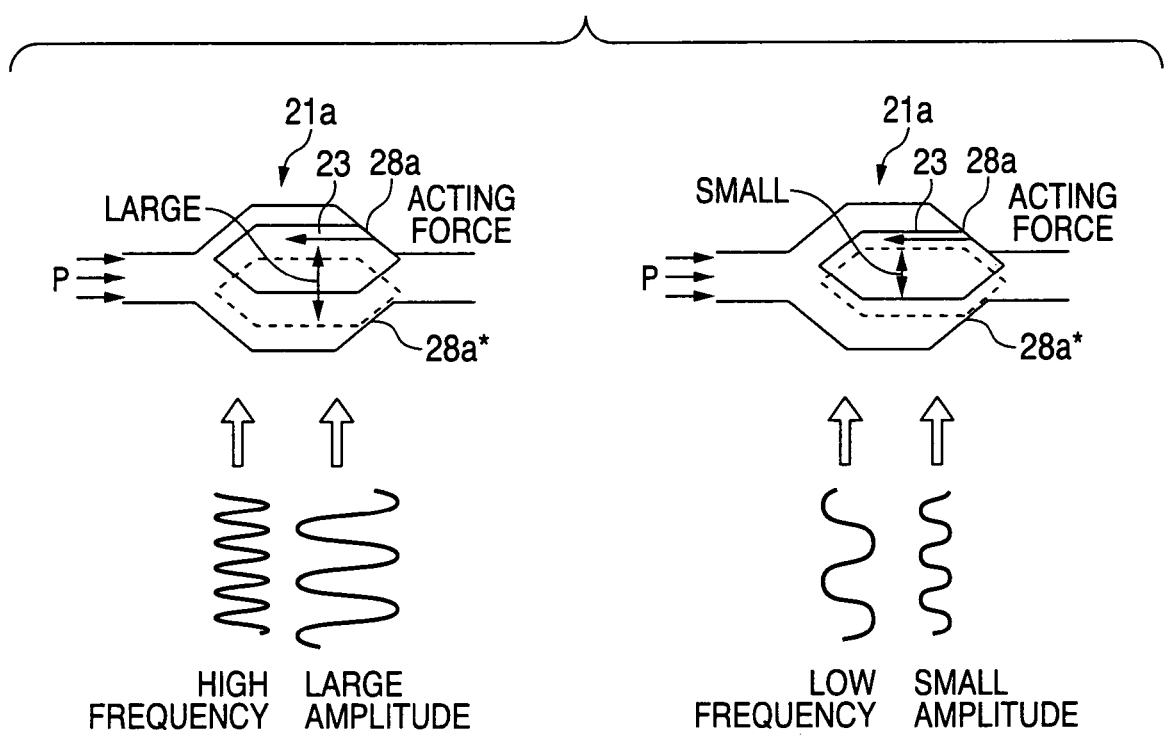
FIG. 12A is a diagram explaining flow rate control of the valve unit in accordance with the sixth embodiment of the invention.
Figure 12B:
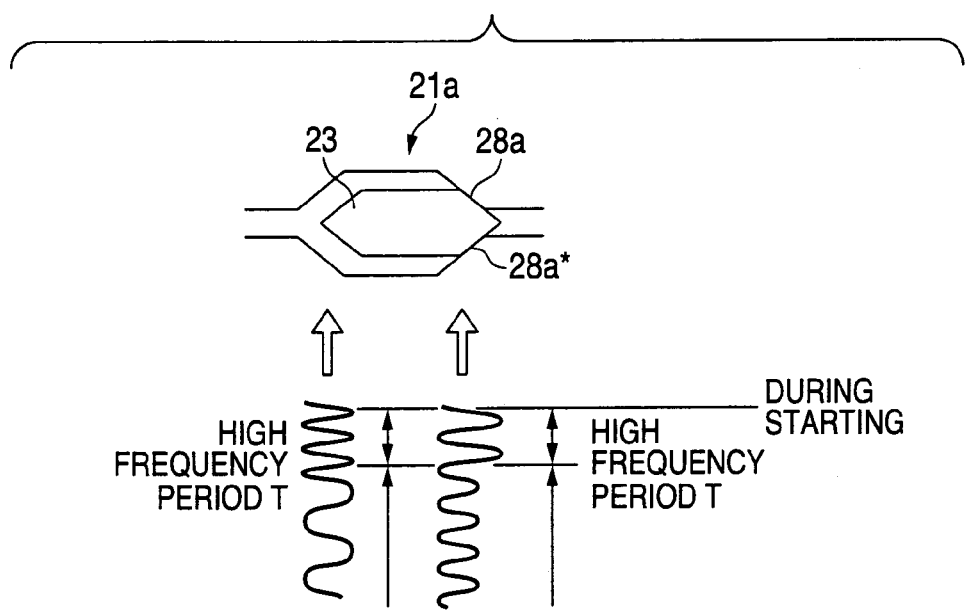
FIG. 12B is a diagram explaining start control of the valve unit in accordance with the sixth embodiment of the invention.
Figure 12C:
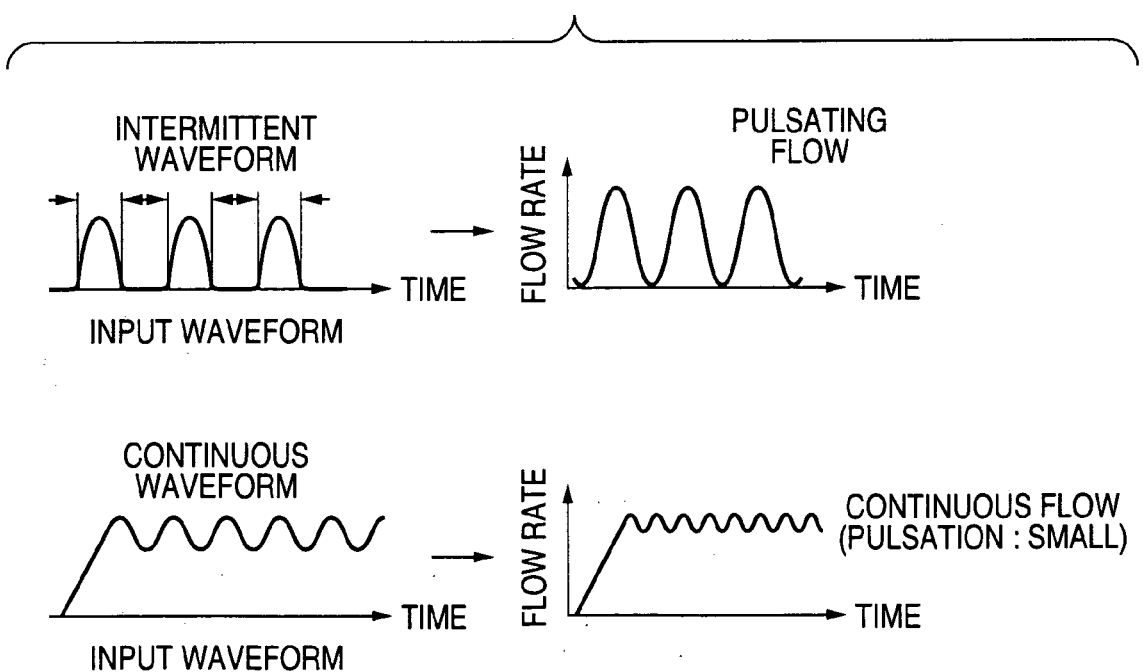
FIG. 12C is a diagram explaining flow rate waveform control of the valve unit in accordance with the sixth embodiment of the invention.

Accordingly, by controlling the above-described angular frequency ω and amplitude A of the driving current of the piezoelectric element 24, various valve control becomes possible, such as flow rate control, start control, flow rate waveform, and the like. FIG. 12A is a diagram explaining flow rate control of the valve unit in accordance with the sixth embodiment of the invention. FIG. 12B is a diagram explaining start control of the valve unit in accordance with the sixth embodiment of the invention. FIG. 12C is a diagram explaining flow rate waveform control of the valve unit in accordance with the sixth embodiment of the invention.

As shown in FIG. 12A, if high-frequency vibrations are applied from the piezoelectric element 24 to the microvalve 21a, the valve element 23 receives a large energy and undergoes vibrations with a large amplitude. Consequently, the microvalve 21a allows the fluid to flow with a large opening. In contrast, it is apparent that in a case where low-frequency vibrations are applied, the valve element 23 undergoes small vibrations, allowing the fluid to flow with a small opening.

Similarly, as vibrations of a large amplitude are applied from the piezoelectric element 24 to the microvalve 21a, the valve element 23 undergoes vibrations with a large amplitude, so that the microvalve 21a allows the fluid to flow with a large opening. Meanwhile, in a case where vibrations of a small amplitude are applied, the valve element 23 undergoes vibrations with a small amplitude, allowing the fluid to flow with a large opening.

Thus, the microvalve 21a in accordance with the sixth embodiment is capable of effecting flow rate control by controlling the angular frequency ω and the magnitude of the amplitude A. The relationship between the angular frequency ω or the magnitude of the amplitude A and the flow rate is stored in the valve control table 38a of the storage portion 38 as the relationship between the amplitude Adr and the frequency fdr of the control waveform. As an input is made from the input portion 34, the central control portion 37 causes the waveform control portion 33 to control the driving current.

In the case where the microvalve 21a is in the closed state, the valve element 23 is in close contact with the valve seat 28a by the urging force PV and the surface tension. For this reason, when the microvalve 21a is started, the build-up characteristic at the time of starting is not good even if the driving current of a target vibration and frequency is suddenly applied. Accordingly, as shown in FIG. 12B, the build-up characteristic is improved by applying high-frequency vibrations only for a predetermined time T at the time of starting. Subsequently, main vibrations of a predetermined angular frequency ω are applied. This can be similarly realized by controlling the amplitude.

Namely, by applying vibrations of a large amplitude A only for the predetermined time T at the time of starting, the build-up can be effected speedily, and main vibrations are subsequently applied for allowing the fluid to flow at a predetermined rate.

Figure 13A:
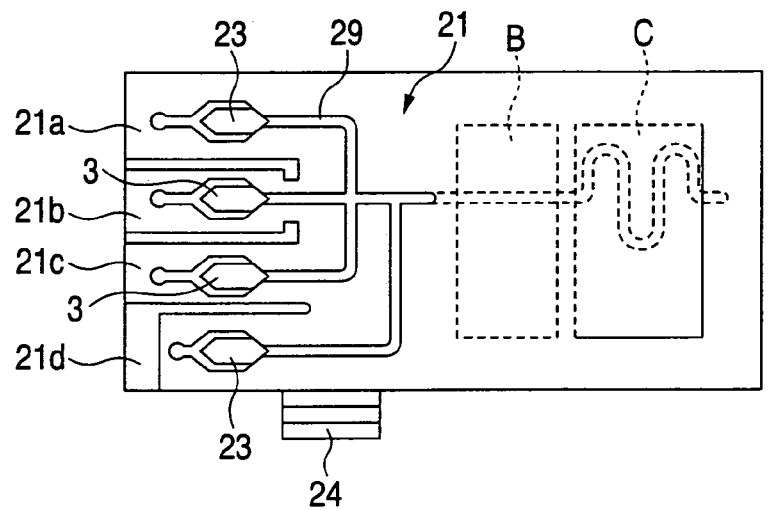
FIG. 13A is an explanatory diagram for individually controlling a plurality of valve units respectively having different resonance points by the vibration of a plurality of frequencies in accordance with the seventh-embodiment of the invention.
Figure 13B:
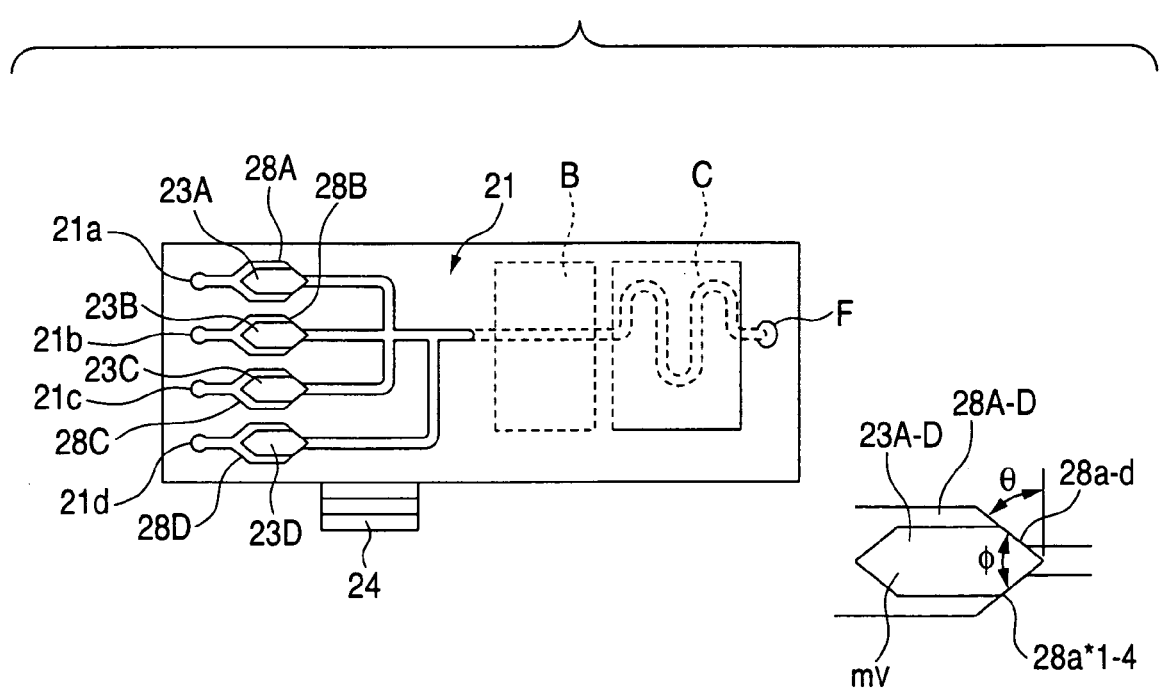
FIG. 13B is an explanatory diagram for individually controlling the plurality of valve units respectively having different dimensions by the vibration of a plurality of frequencies in accordance with the seventh embodiment of the invention.
Figure 13C:
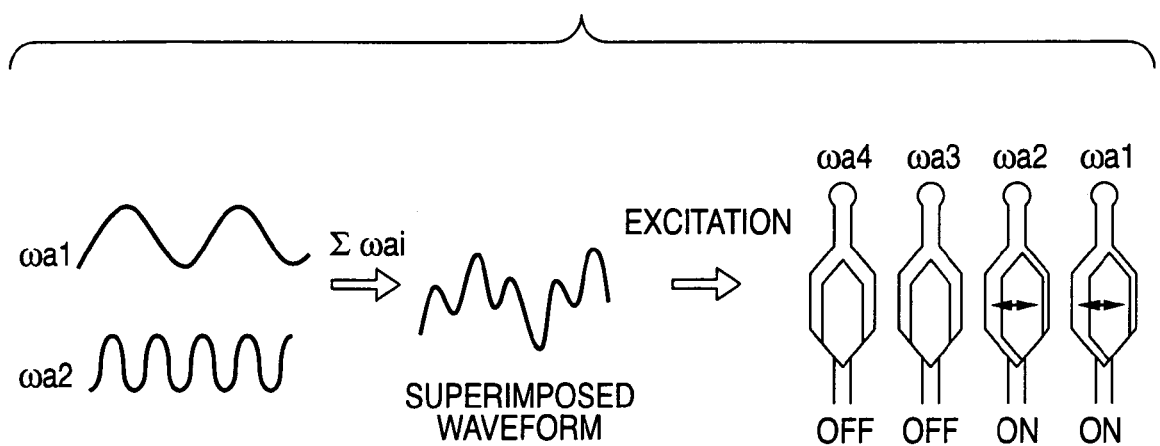
FIG. 13C is a diagram explaining the opening and closing of the plurality of valve units in a case where they are vibrated by the vibration of superimposed waves.

In addition, in cases where flow is controlled, as the flow rate waveform of the flow (flow rate pattern) there are cases where an intermittent flow (pulsation flow) is required, and cases where a continuous flow in which pulsation is small is required. Accordingly, if the driving current is set as a current of an intermittent waveform, as shown in FIG. 12C, the vibration of the piezoelectric element 24 becomes intermittent vibration. Following this, the flow becomes an intermittent flow during the period when the valve element 23 is open. In contrast, in the case of a general alternating current, some portion of the channel of the microvalve 21a is always open, making it possible to obtain a stable flow rate at which pulsation is small. Further, in a case where the flow rate is stabilized by imparting a gradually increasing control waveform and by subsequently off setting it, and a small varying current is superimposed thereon, the valve element 23 can be moved to an offset position. Thus, it is possible to realize a continuous flow of infinitesimal pulsation, as shown in FIG. 13C.

As described above, the microvalve 21a in accordance with the sixth embodiment controls the valve opening and effects flow rate control by controlling the amplitude A or the angular frequency ω of the piezoelectric element 24 by the control waveform applied by the driver 31. A large flow rate can be obtained by imparting a control waveform of a large amplitude or a high frequency, while a small flow rate can be obtained by a driving current of a small amplitude or a low frequency. Further, the build-up characteristic can be improved by imparting large vibrations to the piezoelectric element 24 by allow a driving current of a high frequency or a large amplitude to flow for a predetermined time at the time of starting.

According to the valve control in accordance with the sixth embodiment, the amplitude of the valve element 23 changes by the excitation by the piezoelectric element 24, but the magnitude of the amplitude is not dependent solely on the amplitude of the piezoelectric element 24 itself. Namely, as the valve element 23 is forcibly moved up in the opposite direction to that of the back pressure P owing to the vibration, it is possible to form a greater channel than that corresponding to the amplitude of the piezoelectric element 24, thereby making it possible to enlarge the maximum flow rate, i.e., the dynamic range.

Seventh Embodiment

Next, a description will be given of the microvalve in accordance with a seventh embodiment for controlling a plurality of microvalves individually by superimposing a plurality of frequencies. FIG. 13A is an explanatory diagram for individually controlling a plurality of valve units respectively having different resonance points by the vibration of a plurality of frequencies in accordance with the seventh embodiment of the invention. FIG. 13B is an explanatory diagram for individually controlling the plurality of valve units respectively having different dimensions by the vibration of a plurality of frequencies in accordance with the seventh embodiment of the invention. FIG. 13C is a diagram explaining the opening and closing of the plurality of valve units in a case where they are vibrated by the vibration of superimposed waves.

In FIG. 13A, reference characters 21a to 21d denote microvalves whose valve body substrates 25 formed in the valve-equipped chip 21 have respectively different natural frequencies. The respective microvalves 21a to 21d are provided with valve body substrates 25 which are separated from each other in terms of vibrational science. The microvalves 21a to 21d respectively correspond to the vibrations of different angular frequencies ωa1 to ωa4, and respectively resonate separately or simultaneously. The piezoelectric element 24 is provided on a side surface of the valve-equipped chip 21, and the fluidic circuit chip body 22b provided with the various sensors B for measurement and the fluidic circuit C is laminated on the lower surface of the valve-equipped chip 21. However, it is preferred that a cantilevered construction, for example, be provided so that the vibration of the piezoelectric element 24 facilitates the respective vibrations of the microvalves 21a to 21d.

In the seventh embodiment, a pair of L-shaped slots are formed on both sides of the microvalve 21b and the output-side channel 29, so that the effective breadth of the microvalve 21b is reduced. The breadth of the microvalve 21c as a whole is formed to be small. Further, the length of the microvalve 21d in the flowing direction is formed to be short. In addition to the above, a means for varying the different natural frequencies may be provided.

The valve-equipped chip 21 as a whole is an integral substrate. As the microvalves 21a to 21d are provided in this substrate with the above-described construction, the microvalves 21a to 21d are provided with mutually different natural frequencies.

As shown in FIG. 13C, if a control waveform with one or a plurality of the angular frequencies $\omega a1$ to $\omega a4$ superimposed thereon is allowed to flow across the piezoelectric element 24 of the above-described valve-equipped chip 21 and is thereby vibrated, corresponding ones of the microvalves 21a to 21d resonating with these angular frequencies $\omega a1$ to $\omega a4$ and having natural frequencies of the same angular frequencies $\omega a1$ to $\omega a4$ are opened. Naturally, if one of the angular frequencies $\omega a1$ to $\omega a4$ is applied singly, one of the microvalves 21a to 21d is opened. At this time, if control of the amplitude A is provided in combination, and the amplitude A is varied for each of the microvalves 21a to 21d, the opening of each of the microvalves 21a to 21d can be controlled individually.

It should be noted that although in the seventh embodiment a description has been given of the case of the cantilevered construction, a similar operational effect can be obtained in cases where natural frequencies are varied by other means such as the shape, weight, and material.

In FIG. 13B, reference characters 23A to 23D note valve elements making up the microvalves 21a to 21d. Reference characters 28A to 28D denote valve chambers of the microvalves 21a to 21d. Reference numerals 28a to 28d and 28a* to 28d* denote pairs of opposing valve seats making up the microvalves 21a to 21d.

The microvalves 21a to 21d in the case of FIG. 13B also have different natural frequencies. However, variations are imparted to the natural frequencies by varying the specifications of the valve elements 23A to 23D, the valve chambers 28A to 28D, and the like which are the component elements of the valves. For example, different natural frequencies can be provided by selecting the mass of the valve elements 23A to 23D, specifically their specific gravity and shapes including dimensions, angles Ø, and the like, or by varying the angles θ of the valve seats 28a to 28d and 28a* to 28d* as well as their surface roughness and physical properties of their surfaces.

As shown in FIG. 13C, if a driving current with one or a plurality of the angular frequencies $\omega a1$ to $\omega a4$ superimposed thereon is allowed to flow across the piezoelectric element 24 of the above-described valve-equipped chip 21 and is thereby vibrated, corresponding ones of the microvalves 21a to 21d resonating with these angular frequencies $\omega a1$ to $\omega a4$ and having natural frequencies of the same angular frequencies $\omega a1$ to $\omega a4$ are opened. By concurrently providing control of the amplitude A in combination, control of the openings, among others, can be effected individually.

Further, an opening F is provided at an end of the channel in the valve-equipped chip 21, so that the interior of the channel is open to the atmosphere. Consequently, the odor of a liquid mixture in which fluids from the interiors of the respective chambers have been mixed is, among others, is released to the atmosphere.

Eighth Embodiment

An eighth embodiment is the valve control in a first microvibration mode in which microvibrations are applied to the microvalve 21a. The configuration of the valve element 21a in accordance with the eighth embodiment is similar to that shown in FIG. 8A, so that reference will be made to FIGS. 8 to 12C, particularly FIG. 12A.

In the valve control in the first microvibration mode, at the time of the opening and closing of the valve, micro-amplitude vibrations, particularly microvibrations of a frequency and an amplitude different from those of main vibrations, are applied singly or by being superimposed on the main vibrations.

The microvibrations used in the first microvibration mode do not have the force of a magnitude sufficient to open the microvalve 21a. When the valve through which the fluid is flowing is closed, the mere stopping of the main vibrations results in poor affinity between the valve element 23 and the valve seat 28a (seatability is poor). Namely, it is impossible to expect the wedge effect whereby the force is enhanced by the principle of the lever as the back pressure P applies the force to the inclined surface. On the other hand, when the valve is opened, it is difficult to actuate the valve element 23 due to the urging force PV pressing the valve element 23 and the surface tension between the valve element 23 and the valve seat 28a, making it difficult to smoothly open the valve.

In this eighth embodiment, as microvibrations are applied during closing, the affinity between the valve element 23 and the valve seat 28a is enhanced, and the wedge effect can be improved. Therefore, higher pressure resistance can be provided. During opening, the apparent frictional force is reduced, and it becomes possible to open the microvalve 21a smoothly, thereby permitting valve control under high pressure.

In the starting control in accordance with the sixth embodiment, the build-up characteristic is improved by applying vibrations of a high frequency or vibrations of a large amplitude A during starting. In the first microvibration mode in accordance with the eighth embodiment, however, the valve is opened smoothly without strain rather than improving such a build-up characteristic and the speediness.

Ninth Embodiment

Valve control in a ninth embodiment is valve control in a second microvibration mode.

The configuration of the microvalve 21a in accordance with the ninth embodiment is similar to that shown in FIG. 12A, so that reference will be made to FIGS. 8 to 13C, particularly FIG. 13A.

Figure 14:
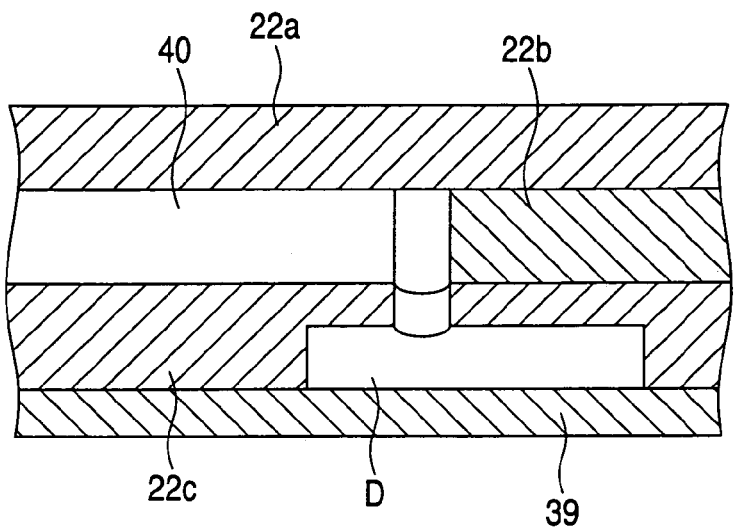
FIG. 14 is a cross-sectional view of an essential portion of a degassing arrangement of the microvalve in accordance with the ninth embodiment of the invention.

The valve control in the second microvibration mode is control in which vibrations of a micro-amplitude are applied singly or by being superimposed on the main vibrations by the piezoelectric element 24 for the purpose of degassing from the channel. In addition, to render this degassification more effective, the microvalve 21a in accordance with the ninth embodiment is provided with a degassing arrangement in the channel. FIG. 14 is a cross-sectional view of an essential portion of a degassing arrangement of the microvalve in accordance with the ninth embodiment of the invention.

A gas, normally air, is filled in the channel before a fluid flows therethrough. Unless this air is vented, it is difficult to allow the fluid to flow. However, if the microvalve 1a is totally opened and the fluid is caused to flow out, the fluid disadvantageously flows into the various sensors B and the fluidic circuit C, rendering precision control difficult.

Accordingly, in the ninth embodiment, the vibrations of a micro-amplitude not having the force sufficient to open the microvalve 21a are applied singly or by being superimposed for degassing from the channel. By virtue of the microvibrations in this second microvibration mode, air alone flows out from between the valve element 23 and the valve seat 28a. When the fluid comes to be filled, vibrations are naturally suppressed, and the microvalve 21a subsequently assumes the closed state. By effecting such microvibrations, air can be discharged, but the fluid is incapable of flowing out from the gap between the valve element 23 and the valve seat 28a. Further, by applying vibrations in this second microvibration mode for a long time, a leading end of the fluid is oozed out from the gap between the valve element 23 and the valve seat 28a, thereby making it possible to cause the head of a liquid to come out. Thus, at the time of starting the control, it becomes possible to make a starting point of time accurate, permitting high-precision control.

It should be noted that a degassing arrangement may be provided in the channel of the microvalve 21a, as shown in FIG. 14. In FIG. 14, reference character 22c denotes the output-side reservoir portion having a reservoir D for holding the fluid flowing out from the microvalve 21a. Reference numeral 39 denotes a gas permeable film made of such as polyethylene and polypropylene, which allows a gas to permeate therethrough but does not allow a liquid to permeate therethrough. Numeral 40 denotes a channel of the fluidic circuit C provided in the fluidic circuit chip body 22b.

In FIG. 14, the fluid flowing out from an outlet port connected to the channel 40 is temporarily stored in the reservoir D. The gas permeable film 39 is provided in such a manner as to cover this reservoir D. As the reservoir D is covered by this gas permeable film 39, the air venting in the second microvibration mode can be reinforced. Further, since the gas permeable film 39 covering the reservoir D is provided on the outlet side of the microvalve 21a, the air on the downstream side where the air is likely to accumulate can be discharged to the outside. It should be noted that a similar effect can be obtained by forming micropores instead of the gas permeable film. Another substrate or the like may be laminated on the gas permeable film 39.

Furthermore, in a case where the microvalve 21a in accordance with the ninth embodiment is used in the fluidic circuit chip for treating bacteria, if the gas permeable film 39 is formed as a film which transmits air but does not transmit a liquid and bacteria, it is possible to provide a safe fluidic circuit chip for biological treatment since the liquid and the bacteria do not leak to the outside.

10th Embodiment

Figure 15A:
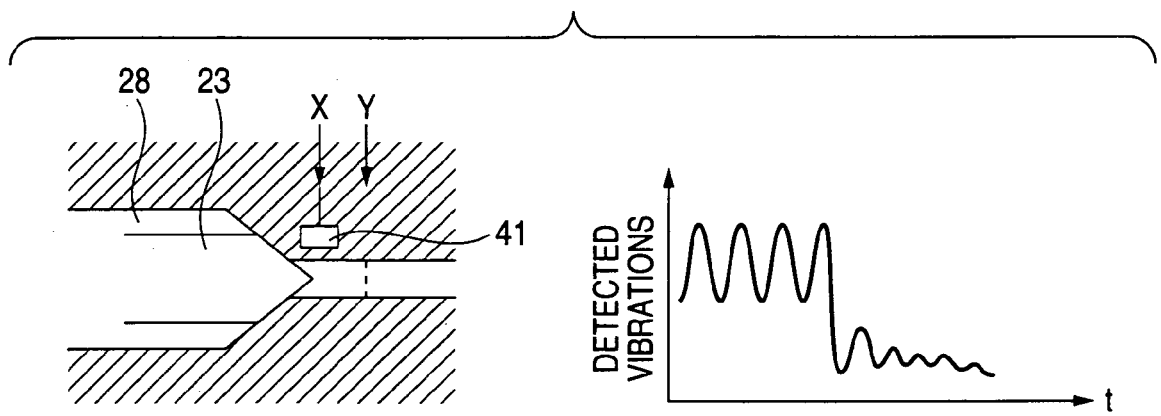
FIG. 15A is a diagram explaining first head-coming-out detection when valve control is performed for effecting the coming-out of the head in accordance with the 10th embodiment of the invention.
Figure 15B:
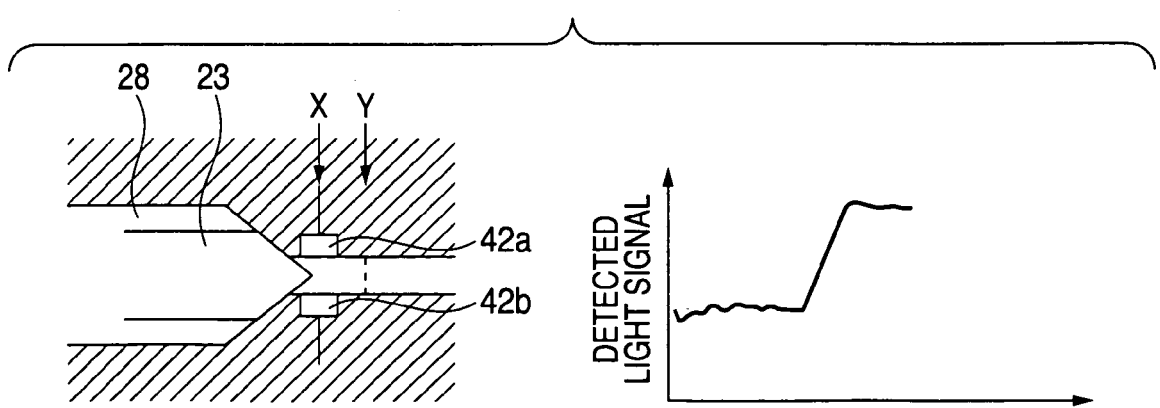
FIG. 15B is a diagram explaining second head-coming-out detection when valve control is performed for effecting the coming-out of the head in accordance with the 10th embodiment of the invention.

Valve control in accordance with a 10th embodiment is auxiliary control for effectively performing valve control for causing the head of the liquid to come out in the ninth embodiment. FIG. 15A is a diagram explaining first head-coming-out detection when valve control is performed for effecting the coming-out of the head in accordance with the 10th embodiment of the invention. FIG. 15B is a diagram explaining second head-coming-out detection when valve control is performed for effecting the coming-out of the head in accordance with the 10th embodiment of the invention.

In FIG. 15A, reference numeral 41 denotes vibration detecting means for detection the vibration of the valve. As the vibration detecting means 41, a microphone for detecting sound, a piezoelectric element provided at a position X at the valve seat 28a or 28a*, or the like is suitable. The vibration detecting means 41 may be one which is adapted to detect a change in the electric field or the magnetic field. The vibration detecting means 41 detects a change in the vibration at the time when a shift takes place from the state of aerial vibration to the state of the hydraulic vibration, and the channel is filled with the liquid, as shown in FIG. 15A. It should be noted that the position of head-coming-out detection may be set at a position Y slightly downstream of the position X so as to detect the position where leakage has occurred. In the case where the coming-out of the head has been detected at the position X, the liquid feeding accuracy improves, and leakage does not occur even if a disturbance is applied after the coming-out of the head. However, in the case where the coming-out of the head has been detected at the position Y, when the movement of the liquid is started after the coming-out of the head, the liquid is capable of moving very smoothly, so that the liquid feeding accuracy becomes higher. If the vibration detecting means 41 is made detachable, the vibration detecting means 41 can be reused when the microvalve 21a and other components of the fluid control chip are replaced.

In FIG. 15B, reference character 42a denotes a light-emitting element, and 43b denotes a light-receiving element. Light emitted from the light-emitting element 42a is received by the light-receiving element 42b. Specifically, light transmittances of the liquid and air may be detected to detect the coming-out of the head. Alternatively, changes in the refractive indices of the liquid and air or reflectances of the light emitted to and reflected from the valve seat 28a may be detected by the light-receiving element 42b (the light-receiving element 42b is not shown). Detection may be effected at either of the positions X and Y in the same way as described above. If the light-emitting device 42a and the light-receiving element 42b are made detachable, they can be reused when the microvalve 21a and other components of the fluid control chip are replaced.

11th Embodiment

Figure 16A:
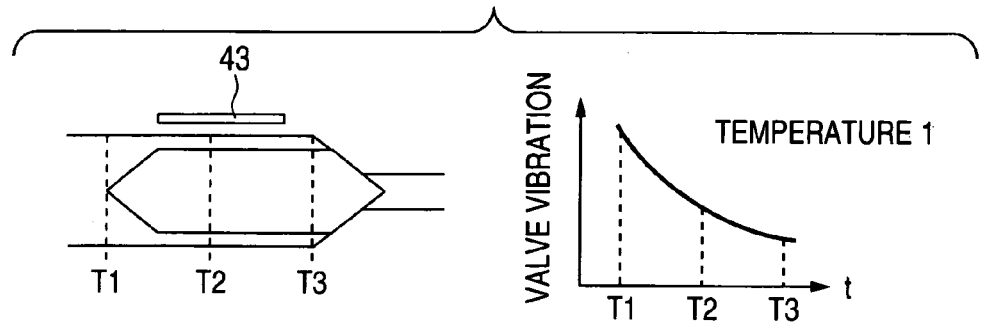
FIG. 16A is a diagram explaining the detection of the flow velocity and physical properties on the basis of vibration in accordance with the 11th embodiment of the invention.
Figure 16B:
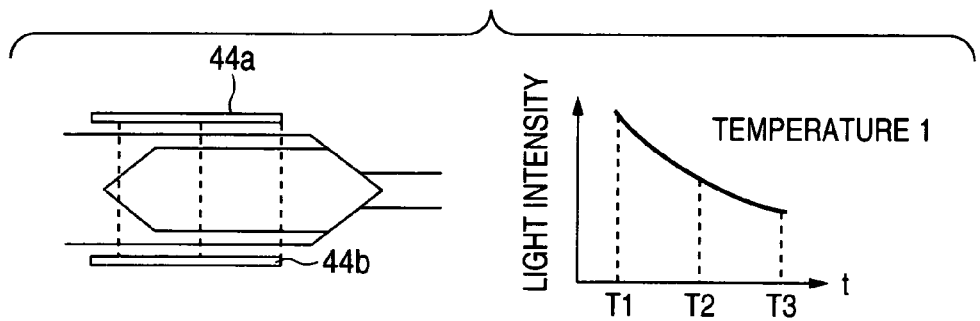
FIG. 16B is a diagram explaining the detection of the flow velocity and physical properties on the basis changes in the light intensity in accordance with the 11th embodiment of the invention.
Figure 16C:
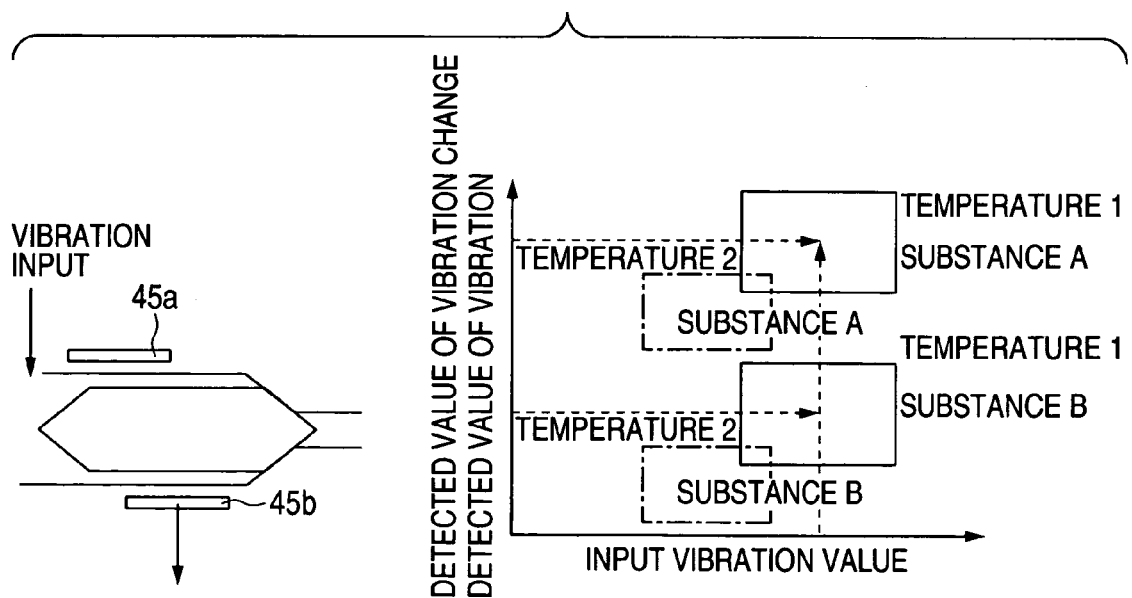
FIG. 16C is a diagram explaining the detection of physical properties on the basis of valve vibration in accordance with the 11th embodiment of the invention.

The microvalve 21a in accordance with an 11th embodiment is for performing valve control effectively, and for detecting the flow velocity and physical properties to enhance the liquid feeding accuracy and the analytical accuracy in processing by the chip. FIG. 16A is a diagram explaining the detection of the flow velocity and physical properties on the basis of vibration in accordance with the 11th embodiment of the invention. FIG. 16B is a diagram explaining the detection of the flow velocity and physical properties on the basis changes in the light intensity in accordance with the 11th embodiment of the invention. FIG. 16C is a diagram explaining the detection of physical properties on the basis of valve vibration in accordance with the 11th embodiment of the invention.

In FIG. 16A, reference numeral 43 denotes a vibration detecting means for detecting the vibration of the valve element 23 of the microvalve 21a. The flow of the liquid through the valve chamber 28 is detected by the vibration detecting means 43, and the flow velocity and physical properties are detected from its valve vibration characteristics. As shown in FIG. 16A, the valve vibration of the liquid moving in a time T1 is detected, and the valve vibration is repeatedly detected further for a time T2 and a time T3. If a curve of this change and the temperature at that time are known, it is possible to calculate the viscosity and the flow velocity, and the substance can be identified by using this as one clue.

Next, in FIG. 16B, reference character 44a denotes a light-emitting element for emitting light to detect the flow velocity and physical properties, and 44b denotes a light-receiving element for receiving the light from the light-emitting element 44a. The change in the light intensity occurring when the fluid flows through the valve chamber 28 is detected by the light-receiving element 44b, and the flow velocity and physical properties are determined from this light intensity change characteristic. As shown in FIG. 16B, the light intensity of the fluid moving in the time T1 is detected, and the light intensity is repeatedly detected further for the time T2 and the time T3. If a curve of this change and the temperature at that time are known, it is possible to calculate the viscosity and the flow velocity, and the substance can be identified by using this as one clue.

Alternatively, the flow velocity and physical properties can be specified on the basis of a predetermined transit time of a fluid detected by detecting means (not shown) located at two positions when the liquid flows. In this case, an optically detecting means or the like is conceivable as the detecting means, but the detecting means is not particularly limited. Preferably, if detecting positions are arranged at two positions upstream of the inlet side of the chamber 28, valve control in the downstream chamber 28 is facilitated.

A description has been given above of arrangements for specifying physical properties by measuring the time, but the physical properties can be specified from the relationship between the input and the output. In FIG. 16C, reference character 45a denotes an exciting means such as a piezoelectric element or the like, and 45b denotes a vibration detecting means for detecting the vibration occurring in the valve element 23 by the vibration inputted by the exciting means 45a. It should be noted that the vibration detecting means 45b may be adapted to detect a change in vibration. If the temperature and the like are taken into consideration in this relationship between the input and the output, the substance can be identified from the viscosity and the like of the liquid. To automatically effect this identification of the substance, the relationship between vibration inputs and detected values of vibration or detected values of vibration change, as well as a physical property table which makes it possible to identify the substance from the temperature, are provided in advance in the storage portion 38 together with the valve control table 38a. The state detecting means in accordance with the 11th embodiment of the invention includes the vibration detecting means 43, the light-emitting element 44a, the light-receiving element 44b, and the vibration detecting means 45b. If this state detecting means is made detachable, the state detecting means can be reused when the microvalve 21a and other components of the fluid control chip are replaced.

In the 11th embodiment, since the physical properties are specified and the flow velocity is detected, the accuracy of liquid feeding and/or the accuracy of the analysis become advanced.

12th Embodiment

Figure 17A:
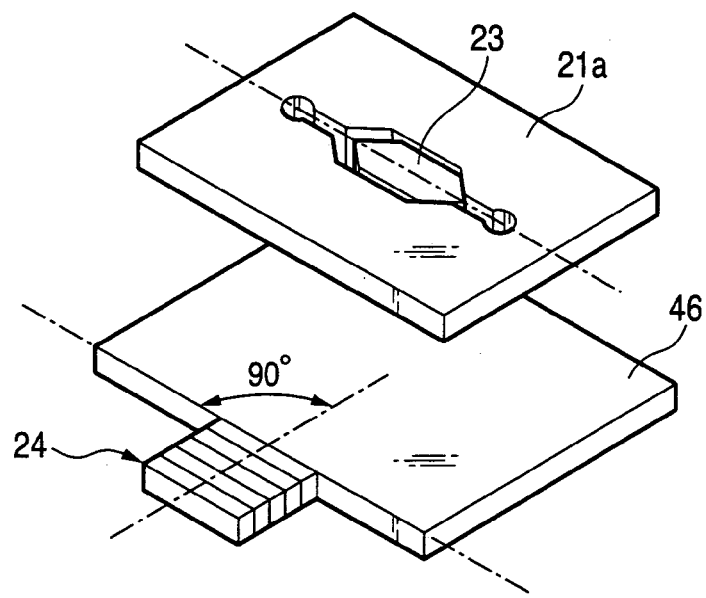
FIG. 17A is an explanatory diagram of first assembly of the valve unit and the piezoelectric element in accordance with the 12th embodiment of the invention.
Figure 17B:
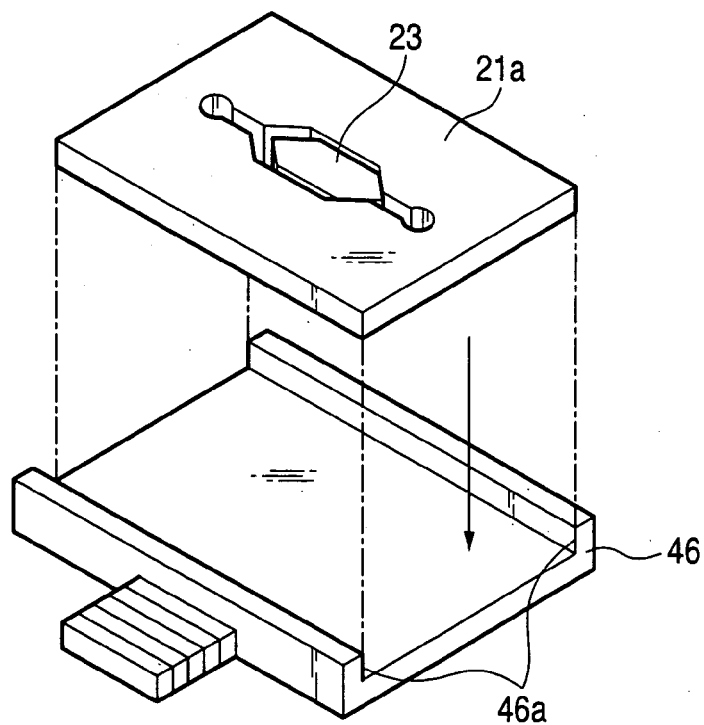
FIG. 17B is an explanatory diagram of second assembly of the valve unit and the piezoelectric element in accordance with the 12th embodiment of the invention.
Figure 18:
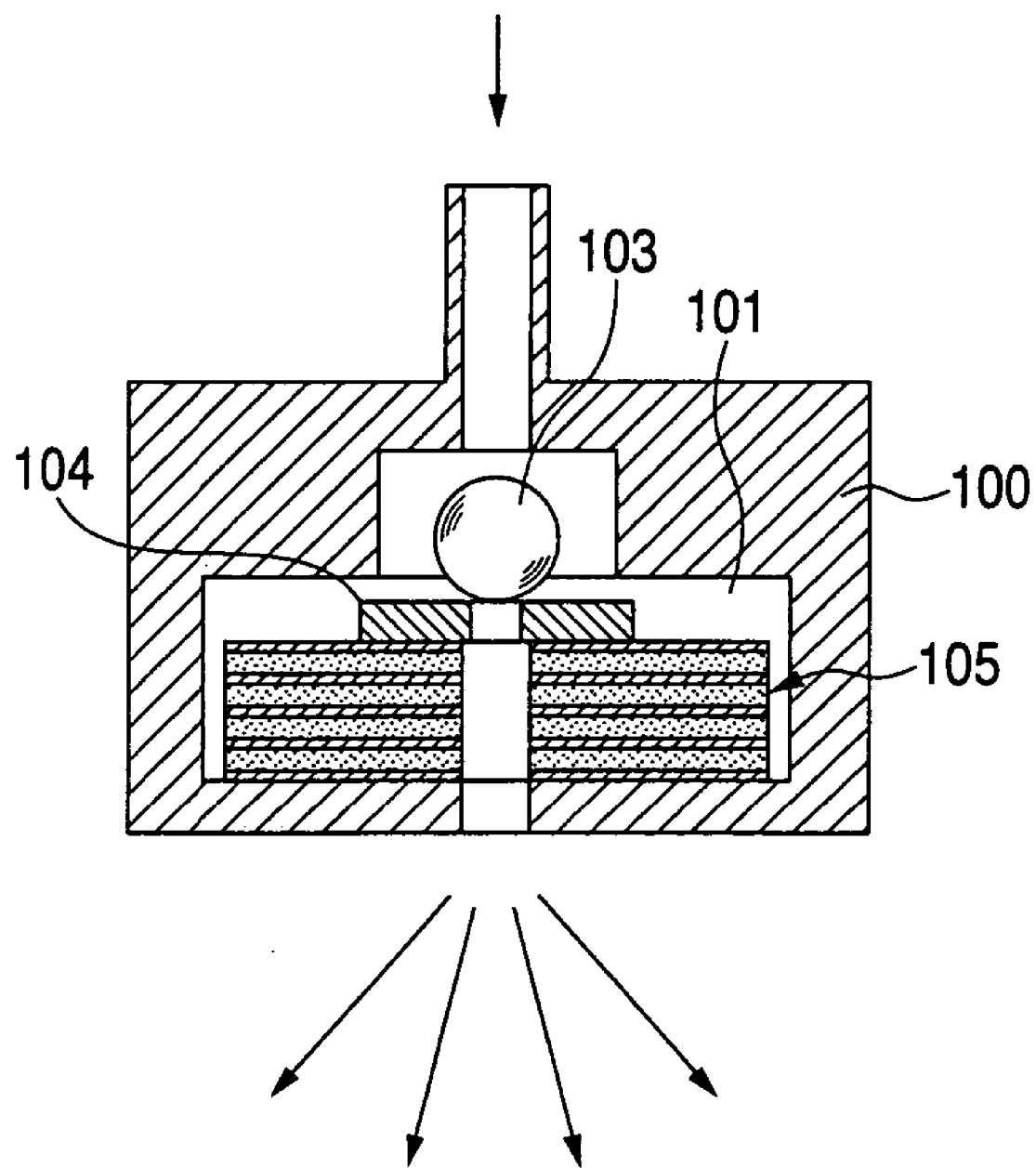
FIG. 18 is a schematic diagram of a conventional quick action type valve.

In the microvalve 21a in accordance with a 12th embodiment, a measure is devised in the assembly of the piezoelectric element 24 to enhance the accuracy of valve control. FIG. 17A is an explanatory diagram of first assembly of the valve unit and the piezoelectric element in accordance with the 12th embodiment of the invention. FIG. 17B is an explanatory diagram of second assembly of the valve unit and the piezoelectric element in accordance with the 12th embodiment of the invention.

When the valve-equipped chip 21 is replaced, the piezoelectric element 24 needs to be removed and mounted on a new valve-equipped chip 21. At this time, the direction of flow of the microvalve 21a needs to be perpendicular to the piezoelectric element 24. Accordingly, the piezoelectric element 24 must essentially be accurately mounted on a side surface of the valve-equipped chip 21 perpendicularly thereto. In its assembly, micron-order accuracy is required for its assembly. It is extremely difficult for a user of the microvalve 21a to effect such assembly at the time of chip replacement.

In FIGS. 17A and 17B, reference numeral 46 denotes a fixing member for fixing the piezoelectric element 24. Reference character 46a denotes a guide formed on the fixing member 46. As shown in FIG. 17A, the mounting surface of the fixing member 46 is formed accurately in parallel to the direction of expansion and contraction of the piezoelectric element 24, and a datum line perpendicular to the direction of expansion and contraction is formed at a ridge line or a flat surface, e.g., each of two parallel side surfaces of a rectangular parallelopiped. At the same time, two upper and lower flat surfaces of the valve-equipped chip 21 are also accurately formed into parallel surfaces. In addition, as shown in FIG. 17B, guides 46a are provided on the fixing member 46, and these guides 46a make it possible to accurately mount the valve-equipped chip 21 in the direction perpendicular to the direction of expansion and contraction. It should be noted that the fixing member 46 and the valve-equipped chip 21 are preferably made detachable from each other.

With the microvalve 21a in accordance with the 12th embodiment, the assembly of the piezoelectric element 24 is effected from the direction perpendicular to the direction of expansion and contraction of the piezoelectric element 24. Namely, the piezoelectric element 24 is disposed on the mounting surface of the fixing member 46 from the vertical direction to the lower or upper surface of the valve-equipped chip 21 by setting the datum line of the fixing member 46 to the datum line (flowing direction) of the valve-equipped chip 21. In this case, assembly is extremely facilitated because of surface contact and because the datum lines are merely made to coincide with each other, and assembly is made possible without causing a micro-order assembly error.

At this time, if assembly is effected such that the line of expansion and contraction of the piezoelectric element 24 intersects the center of gravity of the valve-equipped chip 21, the distribution of vibration in the valve-equipped chip 21 can be brought closer to a uniform distribution. In addition, similarly, if the fixing member 46 of the piezoelectric element 24 is made of a highly rigid material, and the valve-equipped chip 21 is fixed at three or more positions, and if the valve unit is fixed in a region surrounded by these fixing positions, the distribution of vibration in the valve-equipped chip 21 can be made uniform even if the rigidity of the fluid control chip is small.

According to the valve unit in accordance with this embodiment, the opening can be speedily adjusted by varying the frequency and/or the amplitude of the vibration. Further, control is made easy and accurate, the dynamic range is widened, the pulsation is made small, and the response is made speedy.

Since the exciting means is the piezoelectric element, control can be effected easily. Since the exciting means and/or the driver is detachable, the exciting means and/or the driver can be reused when components of the valve unit are replaced.

Since the vibration is applied in the direction perpendicular to the flowing direction of the fluid, maximum use can be made of the vibratory component.

Further, the vibration is applied by varying the frequency within a predetermined frequency range when the flow rate is changed, and at the time of closure the excitation is effected or stopped with a frequency outside the frequency range. Therefore, control of the opening and closure of the valve unit can be simply effected only by the selection of the frequency. An increase in the frequency and an increase in the flow rate can be controlled by being made to correspond to each other uniformly.

Similarly, control of the opening and closure of the valve unit can be simply effected only by the selection of the amplitude. An increase in the amplitude and an increase in the flow rate can be controlled by being made to correspond to each other uniformly.

Since excitation is effected at a frequency or an amplitude higher than that of the main vibration within a frequency range, the build-up can be attained speedily, and the main vibration can be subsequently applied smoothly.

Then, since a continuous flow and/or an intermittent flow can be generated by changing the vibration by the exciting means, pulsation and continuous flow can be obtained as one form of waveform control. In addition, since vibrations having a frequency and an amplitude for reducing contact friction between the valve element and the inner wall of the chamber are imparted during a predetermined period before and after the opening, the frictional force between the valve element and the valve seat is lowered. Thus, even if the pressure is enhanced, it becomes possible to smoothly open the valve unit.

Vibrations having a frequency and an amplitude for reducing contact friction between the valve element and the inner wall of the chamber are imparted during a predetermined period before and after the closure. Therefore, as microvibrations are applied during the closure, the affinity between the valve element and the valve seat is increased, the wedge effect can be improved, and high pressure resistance can be provided.

Vibrations having a frequency and an amplitude for reducing contact friction between the valve element and the inner wall of the chamber are imparted during a predetermined period from a point of time before opening until a point of time after closing the outlet. Therefore, even if the pressure is enhanced, the valve unit can be opened smoothly, and can be closed reliably.

Since vibrations having a frequency and an amplitude which are different from those of main vibrations are superimposed, even if the pressure is enhanced, the valve unit can be opened and closed smoothly.

When a liquid is filled in the chamber, if vibrations are imparted to release a gas from the outlet and not to let the liquid flow out of the chamber, only air flows out through a very small gap occurring between the valve element and the valve seat due to microvibrations. Further, when the liquid comes to be filled, vibrations are suppressed naturally. Subsequently, the valve unit is set in the closed state, but the liquid does not flow out from between the valve element and the valve seat.

A gas venting portion is provided in a downstream-side channel, and the liquid does not permeate it, but only the gas permeates it and is discharged. Therefore, the liquid in the interior does not leak to the outside, and it is possible to prevent the gas in the channel from being compressed to hamper the movement of the fluid.

Since the head-coming-out detecting means for detecting the head portion of the fluid is provided, the head portion of the fluid is detected. Therefore, the fluid feeding accuracy improves, and even if a disturbance is applied after the detection, the leakage of the liquid does not occur.

Since the head-coming-out detecting means is provided at a position downstream of the chamber outlet, the head portion of the fluid is detected, so that the fluid feeding accuracy improves, and the fluid can be fed smoothly after the detection.

Since the head-coming-out detecting means is the vibration detecting means or the optically detecting means, the head portion of the fluid can be detected accurately even on a noncontact basis.

Since the head-coming-out detecting means is detachable, the head-coming-out detecting means can be reused when components of the valve unit are replaced. Since the physical properties or the velocity of the fluid is detected from the change of state in the chamber detected by the state detecting means, the change of state in the chamber is detected by vibration detection, optical detection, or the like. The physical properties or the velocity of the fluid can be detected from that detected change of state and the detection period. The physical properties can also be detected by providing a means for imparting a change of state and by detecting the change of state as a response to a predetermined input made.

Since the state detecting means is a vibration-detecting-means method for detecting the vibration or the optically detecting means, the head portion of the fluid can be detected accurately even on a noncontact basis.

Since the state detecting means is detachable, the state detecting means can be reused when components of the valve unit are replaced.

When the valve unit is controlled, valve control data can be adjusted from the detected velocity and physical properties, so that accuracy in valve control can be improved. The valve control table in the storage portion can be updated, so that accuracy in valve control can be improved.

Control of the microvalve whose chamber breadth is several micro meters to several hundred micro meters is extremely difficult with ordinary actuators, but control can be provided simply.

In addition, since the detecting means is provided for measuring the transit time of a fluid between two points, it becomes possible to detect the velocity of the fluid, i.e., the flow rate. In the case where this detecting means is an optically detecting means, measurement can be effected on a noncontact basis. Since the detecting means s provided at a position downstream of the chamber inlet, valve control of the downstream-side chamber is facilitated. A change of state in the chamber and the channel is detected, and the physical properties or the velocity of the fluid can be detected from that detected change of state and the detection period. Since the detecting means is detachable, the detecting means can be reused when components of the valve unit are replaced.

Furthermore, according to the fluid control chip in accordance with this embodiment, subjects of control can be specified simply from among a plurality of valve units and can be respectively controlled freely by using frequencies by the use of a single exciting means alone. Since vibrations with the amplitude varied are applied to each of the valve units to be controlled, the opening can be speedily adjusted by changing the amplitude. Further, control is made easy and accurate, the dynamic range is widened, the pulsation is made small, and the response is made speedy.

A predetermined region of the valve-equipped substrate including at least one valve unit has a natural frequency different from that of the region of the valve-equipped substrate including the other valve units. Therefore, subjects of control can be specified simply from among a plurality of regions of the valve-equipped substrate and can be respectively controlled freely by using frequencies by the use of a single exciting means alone.

Since at least one of the mass, shape, specific gravity, and surface roughness of the valve element and the shape and surface roughness of the chamber is varied, the natural vibration can be changed simply. The natural vibration can be changed without such as the dividing of the valve-equipped substrate and a decline in the strength.

The fixing member having a surface parallel to the vibrating direction is provided, and the valve-equipped substrate is mounted on the mounting surface of the fixing member. Therefore, anyone is capable of easily performing the assembly of the exciting means to the valve-equipped substrate. Since the fixing member and the valve-equipped substrate are detachable with respect to each other, the user can repeatedly use the exciting means at the time of replacing the valve-equipped substrate of the fluid control chip, so that the arrangement is economical.

The frequency or the amplitude of the vibration is varied, and the amplitude of the valve element is changed by the varied vibration to change the opening/closing state or the opening level of the outlet. Therefore, the opening can be speedily adjusted by varying the frequency and/or the amplitude of the vibration. Further, control is made easy and accurate, the dynamic range is widened, the pulsation is made small, and the response is made speedy.

The vibration is applied by varying the frequency within a predetermined frequency range, and at the time of closure the excitation is effected or stopped with a frequency outside the frequency range. Therefore, control of the opening and closure of the valve unit can be simply effected only by the selection of the frequency.

The vibration is applied by varying the amplitude within a predetermined amplitude range, and at the time of closure the excitation is effected or stopped with an amplitude outside the amplitude range. Therefore, control of the opening and closure of the valve unit can be simply effected only by the selection of the amplitude.

The plurality of microvalves are provided in the valve-equipped substrate in such a manner as to be separated from each other in terms of vibrational science so as to be provided with mutually different natural frequencies. Therefore, subjects of control can be specified simply from among the plurality of valve units and can be respectively controlled freely by using frequencies by the use of a single exciting means alone.

Since the vibrating direction of the exciting means and the position of the center of gravity of the structural body including at least the valve-equipped substrate coincide with each other, the distribution of vibration in the fluid control chip can be made uniform.

Since there are three or more fixing positions for fixing the valve-equipped substrate to the holding member, even if the rigidity of the fluid control chip is small, the distribution of vibration can be made uniform by the three-point support.

Since the valve-equipped substrate is detachable, the holding member can be reused when components of the fluid control chip are replaced. Since the vibration is applied from the direction perpendicular to the flowing direction of the fluid in the chamber, maximum use can be made of the vibratory component. Furthermore, pulsation and continuous flow can be obtained as one form of waveform control.

Many modifications and variations of the present invention are possible in the light of the above techniques. It is therefore to be understood that within the scope of the invention the invention may be practiced otherwise than as specifically described.

What is claimed is:

1. A valve unit comprising:
   a valve body substrate including a chamber having an inlet and an outlet for fluid; and
   a valve element accommodated in said chamber, wherein:
   the shape of each of both ends of said valve element has a wedge-shaped, spherical, or conical form,
   said inlet and said outlet of said chamber include inclined portions for contacting respective ends of said valve element to enable said valve unit to be closed in response to fluid flow in either direction within said chamber, and
   when said chamber is subjected to vibration, in a state in which said valve element is located at said inclined portion of said outlet due to fluid pressure within said chamber so as to close said outlet, said valve element moves with respect to said inclined portion of said outlet and said outlet is opened.

2. The valve unit of claim 1, wherein said valve-element urging component or said valve element is formed of a magnetic material and is attracted by a magnetic force of the other.

3. A valve unit comprising:
   a valve body substrate including a chamber having an inlet and an outlet for fluid; and
   a valve element accommodated in said chamber, wherein:
   the shape of said valve element is spherical,
   said inlet and said outlet of said chamber include inclined portions for contacting respective ends of said valve element to enable said valve unit to be closed in response to fluid flow in either direction within said chamber,
   an angle made by the inclined portion of the inlet is smaller than an angle made by the inclined portion of the outlet, and
   when said chamber is subjected to vibration, in a state in which said valve element is located at said inclined portion of said outlet due to fluid pressure within said chamber so as to close said outlet, said valve element moves with respect to said inclined portion of said outlet and said outlet is opened.

4. A valve unit comprising:
   a valve body substrate including a chamber having an inlet and an outlet for fluid; and
   a valve element accommodated in said chamber, wherein:
   the shape of each end of said valve element has a wedge shaped or conical form,
   an apex angle of an input-side end of said valve element is smaller than that of an output-side end thereof,
   said inlet and said outlet of said chamber include inclined portions for contacting respective ends of said valve element to enable said valve unit to be closed in response to fluid flow in either direction within said chamber,
   an angle made by the inclined portion of the inlet is smaller than an angle made by the inclined portion of the outlet, and when said chamber is subjected to vibration, in a state in which said valve element is located at said inclined portion of said outlet due to fluid pressure within said chamber so as to close said outlet, said valve element moves with respect to said inclined portion of said outlet and said outlet is opened.

5. A valve unit comprising:
a chamber having an inlet and an outlet for fluid; and
a valve element accommodated in said chamber, wherein:
an inclined portion is provided at said outlet,
when said chamber is subjected to vibration, in a state in which said valve element is located at said inclined portion due to fluid pressure within said chamber so as to close said outlet, said valve element moves with respect to said inclined portion and said outlet is opened, and
the movement of said valve element is promoted by vibrating said chamber with a frequency higher than that of a main vibration or by vibrating said chamber with an amplitude higher than that of the main vibration during a predetermined period before and after the opening of said outlet by said valve element.

6. A valve unit comprising:
a chamber having an inlet and an outlet for fluid; and
a valve element accommodated in said chamber, wherein:
an inclined portion is provided at said outlet,
when said chamber is subjected to vibration, in a state in which said valve element is located at said inclined portion due to fluid pressure within said chamber so as to close said outlet, said valve element moves with respect to said inclined portion and said outlet is opened, and
contact friction between said valve element and an inner wall of said chamber is reduced by imparting a vibration having a predetermined frequency and amplitude during a predetermined period before and after the opening of said outlet by said valve element.

7. The valve unit of claim 6, wherein the vibration having the predetermined frequency and amplitude is imparted to said chamber.

8. A valve unit comprising:
a chamber having an inlet and an outlet for fluid;
a valve element accommodated in said chamber; and
a valve-element urging component that urges said valve element toward said outlet of said chamber, wherein
the opening or closing state of said outlet or an opening level thereof is varied as a frequency or an amplitude of a vibration applied to said chamber is varied and as a motional amplitude of said valve element is varied by the varied vibration.

9. The valve unit of claim 8, wherein said valve-element urging component or said valve element is formed of a magnetic material and is attracted by a magnetic force of the other.

10. A valve unit comprising:
a chamber having an inlet and an outlet for fluid;
a valve element accommodated in said chamber;
an exciting component that vibrates said chamber so as to open and close said outlet of said chamber; and
a driver that drives said exciting component, wherein:
said exciting component varies the opening or closing state of said outlet or an opening level thereof by varying a frequency or an amplitude of a vibration applied to said chamber and by varying a motional amplitude of said valve element by the varied vibration, and said exciting component superimposes a vibration having a frequency and an amplitude different from those of a main vibration on the main vibration.

11. A valve unit comprising:
a chamber having an inlet and an outlet for fluid;
a valve element accommodated in said chamber;
an exciting component that vibrates said chamber so as to open and close said outlet of said chamber; and
a driver that drives said exciting component, wherein:
said exciting component varies the opening or closing state of said outlet or an opening level thereof by varying a frequency or an amplitude of a vibration applied to said chamber and by varying a motional amplitude of said valve element by the varied vibration, and
said exciting component imparts such a vibration that a gas is released from said outlet and fluid is not discharged from inside said chamber when fluid is within said chamber.

12. A valve unit comprising:
a chamber having an inlet and an outlet for fluid;
a valve element accommodated in said chamber;
an exciting component that vibrates said chamber so as to open and close said outlet of said chamber;
a driver that drives said exciting component; and
a gas venting portion is provided in a downstreamside channel of said chamber so that a liquid does not permeate said gas venting portion and only gas permeates said gas venting portion and is discharged, wherein
said exciting component varies the opening or closing state of said outlet or an opening level thereof by varying a frequency or an amplitude of a vibration applied to said chamber and by varying a motional amplitude of said valve element by the varied vibration.

13. A valve unit comprising:
a chamber having an inlet and an outlet for fluid;
a valve element accommodated in said chamber;
an exciting component that vibrates said chamber so as to open and close said outlet of said chamber;
a driver that drives said exciting component; and
a head-coming-out detecting component that detects a head portion of the fluid when said chamber is filled with the fluid, wherein
said exciting component varies the opening or closing state of said outlet or an opening level thereof by varying a frequency or an amplitude of a vibration applied to said chamber and by varying a motional amplitude of said valve element by the varied vibration.

14. The valve unit of claim 13, wherein said head-coming-out detecting component is provided at a position downstream of said outlet of said chamber.

15. The valve unit of claim 13, wherein said head-coming-out detecting component is a vibration detection component or an optical detection component.

16. The valve unit of claim 13, wherein said head-coming-out detecting component is detachable.

17. A valve unit comprising:
a chamber having an inlet and an outlet for fluid;
a valve element accommodated in said chamber;
an exciting component that vibrates said chamber so as to open and close said outlet of said chamber;
a driver that drives said exciting component; and
a state detecting component that detects a change of state in said chamber when said chamber is filled with the fluid and detects physical properties or a flow velocity of the fluid from the detected change of state, wherein said exciting component varies the opening or closing state of said outlet or an opening level thereof by varying a frequency or an amplitude of a vibration applied to said chamber and by varying an amplitude of said valve element by the varied vibration.

18. The valve unit of claim 17, wherein said state detecting component is a vibration detecting component or an optical detecting component.

19. The valve unit of claim 17, wherein said state detecting component is detachable.

20. The valve unit of claim 17, wherein:
said driver has a control portion for controlling a driving waveform of said exciting component, and
said control portion adjusts valve control data on the basis of the velocity or the physical properties of the fluid detected by said state detecting component.

21. A valve unit comprising:
a chamber having an inlet and an outlet for fluid;
a valve element accommodated in said chamber;
an exciting component that vibrates said chamber so as to open and close said outlet of said chamber; and
a driver that drives said exciting component, wherein:
said exciting component varies the opening or closing state of said outlet or an opening level thereof by varying a frequency or an amplitude of a vibration applied to said chamber and by varying a motional amplitude of said valve element by the varied vibration, and
said chamber is that of a microvalve with the breadth of said chamber being on the order of several micro meters to several hundred micro meters.

* * * * *